US012657212B2

(12) United States Patent
Zhang et al.

(10) Patent No.: US 12,657,212 B2
(45) Date of Patent: Jun. 16, 2026

(54) SYSTEM AND METHOD FOR GENERATIVE ARTIFICIAL INTELLIGENCE-ASSISTED ANALYTICS OF STRUCTURED DATA SETS

(71) Applicant: Accenture Global Solutions Limited, Dublin (IE)

(72) Inventors: Bo Zhang, San Diego, CA (US); Abhishek Mukherji, Fremont, CA (US); Neeru Narang, San Jose, CA (US); Molly Carrene Cho, San Jose, CA (US); Aishwarya Satish, Santa Clara, CA (US); Yajing Chen, New York, NY (US); Lan Guan, New York, NY (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 18/536,208

(22) Filed: Dec. 11, 2023

(65) Prior Publication Data

US 2025/0190449 A1     Jun. 12, 2025

(51) Int. Cl.
*G06F 16/28* (2019.01)
*G06F 16/2457* (2019.01)
*G06F 40/247* (2020.01)

(52) U.S. Cl.
CPC ...... *G06F 16/285* (2019.01); *G06F 16/24578* (2019.01); *G06F 16/288* (2019.01); *G06F 40/247* (2020.01)

(58) Field of Classification Search
CPC ............. G06F 16/285; G06F 16/24578; G06F 16/288; G06F 40/247; G06F 40/30; G06F 40/2473
See application file for complete search history.

(56) References Cited

U.S. PATENT DOCUMENTS

| | | | | |
|---|---|---|---|---|
| 12,039,263 | B1 * | 7/2024 | Mondlock | G06F 40/20 |
| 2023/0131495 | A1 * | 4/2023 | Tater | G06F 40/30 |
| | | | | 706/45 |
| 2024/0202225 | A1 * | 6/2024 | Siebel | G06F 40/40 |
| 2024/0256582 | A1 * | 8/2024 | Jain | G06F 16/3329 |
| 2024/0404655 | A1 * | 12/2024 | Bell | G16H 50/20 |
| 2024/0404685 | A1 * | 12/2024 | Bell | G16H 50/30 |
| 2024/0404686 | A1 * | 12/2024 | Colley | G06F 40/30 |
| 2024/0404687 | A1 * | 12/2024 | Bell | G06Q 10/0633 |

(Continued)

*Primary Examiner* — Kris E Mackes
(74) *Attorney, Agent, or Firm* — Mannava & Kang, P.C.

(57) ABSTRACT

Aspects of the present disclosure provide systems, methods, and computer-readable storage media that support generative artificial intelligence (AI)-assisted analytics of structured data sets. For example, a system may receive a prompt that includes information associated with a structured data set which includes at least some numerical data. The system may provide the prompt as input to an agent orchestrator to select one or more generative AI agents to perform analytics tasks corresponding to the information. The agent orchestrator includes a trained AI classifier configured to select the one or more generative AI agents from a plurality of generative AI agents. The system may execute an ensemble model to generate a response to the prompt based on the structured data set. The ensemble model includes the one or more generative AI agents. The system may output a graphical user interface (GUI) that includes one or more elements based on the response.

19 Claims, 12 Drawing Sheets

(56)　　　　　　References Cited

U.S. PATENT DOCUMENTS

| | | | |
|---|---|---|---|
| 2024/0404703 A1* | 12/2024 | Colley | G06F 8/34 |
| 2024/0404712 A1* | 12/2024 | Bell | G06N 3/045 |
| 2024/0406166 A1* | 12/2024 | Bell | G06N 3/045 |
| 2025/0086647 A1* | 3/2025 | Gao | G06Q 30/015 |
| 2025/0110979 A1* | 4/2025 | Saligrama Shreeram | G06F 16/3344 |
| 2025/0131042 A1* | 4/2025 | Yates | G06Q 30/0641 |
| 2025/0148219 A1* | 5/2025 | Jauhar | G06F 16/288 |

* cited by examiner

514 — Generate agent prompt using selected fields

516 — Run agent orchestrator using prompt and selected tables

518 — Select fields and tables using additional signals (e.g., follow-up questions, data usage, etc.)

510 — Perform semantic search to find and rank top *m* fields within top tables based on custom ranking algorithm 512 — Score greater than threshold?

yes no

502 — Read user prompt

504 — Create embedding of user prompt

506 — Perform semantic search to find and rank top *n* table descriptions based on custom ranking algorithm 508 — Score greater than threshold?

yes no

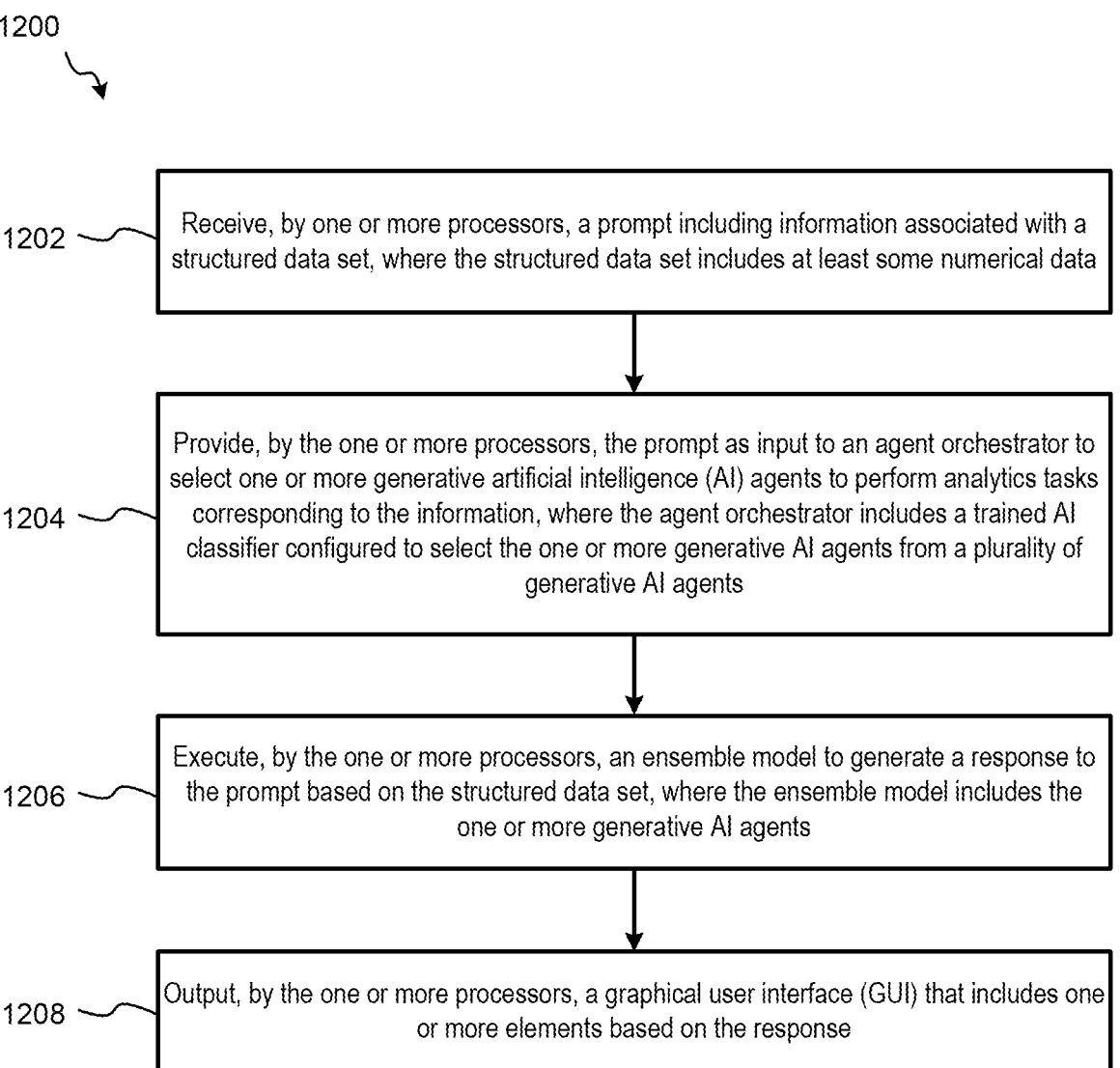

1202 ～ Receive, by one or more processors, a prompt including information associated with a structured data set, where the structured data set includes at least some numerical data 1204 ～ Provide, by the one or more processors, the prompt as input to an agent orchestrator to select one or more generative artificial intelligence (AI) agents to perform analytics tasks corresponding to the information, where the agent orchestrator includes a trained AI classifier configured to select the one or more generative AI agents from a plurality of generative AI agents 1206 ～ Execute, by the one or more processors, an ensemble model to generate a response to the prompt based on the structured data set, where the ensemble model includes the one or more generative AI agents 1208 ～ Output, by the one or more processors, a graphical user interface (GUI) that includes one or more elements based on the response

*FIG. 12*

SYSTEM AND METHOD FOR GENERATIVE ARTIFICIAL INTELLIGENCE-ASSISTED ANALYTICS OF STRUCTURED DATA SETS

TECHNICAL FIELD

The present disclosure relates generally to generative artificial intelligence-assisted analytics of structured data sets. Particular implementations leverage trained artificial intelligence models to determine intent of user prompts and to intelligently select generative artificial intelligence agents to perform analytics tasks to generate responses to the user prompts.

BACKGROUND

Business leaders and executives are looking for quick insights based on real-time reporting, commentary, straightforward data visualization, and data-driven intelligence to accelerate their decision making. For this reason, analytical applications have been developed for particular businesses or industries that provide some data analytics, reporting, and visualization capabilities, but such applications are typically designed to provide limited analytic functionality that is common to a large number of businesses, or such applications are custom-designed for a particular client's operations at a particular time, and therefore difficult to update with new or different functionality as operations change over time or technology advances. Additionally, such analytical applications may require data to be formatted in a particular format in order to be operated on, which requires time and computational or manpower resources depending on the volume of data and the formatting process. This common format may also require some information represented by structured data to be lost, as the format may not be able to incorporate structured data stored according to complex or complicated data schemas. Problems also arise when operating typical analytical applications on data that is organized according to multiple different schemas, such as multiple data tables, because the analytical applications are typically designed to receive as input a single table or tables organized according to a single schema during execution.

Additionally, these analytical applications are typically designed to with the functionality as the primary concern, often without prioritizing ease of use, particularly by customers who are inexperienced in using data-driven user interfaces. As technology has advanced, artificial intelligence and machine learning has been leveraged to create generative artificial intelligence models, such as large language models (LLMs), that can create novel text outputs that can be used to improve ease of use and user interactivity with user interfaces of applications. However, LLMs are typically not suited for performing analytics and can be prone to "hallucinations," such as generating incorrect information in response to a question for which the LLM is unable to correctly answer. As such, although LLMs and generative artificial intelligence have improved usability of some applications, these improvements have not extended to analytical applications and to structured data set contexts.

SUMMARY

Aspects of the present disclosure provide systems, devices, methods, and computer-readable storage devices and media that support generative artificial intelligence-assisted analytics of structured data sets. The aspects described herein enable a system to provide a response to a user prompt that includes a question related to analysis of a structured data set in a natural language, user-friendly manner that can be utilized by agents of an organization without training in operation of analytics applications. For example, a system may receive a prompt that includes information associated with a structured data set which includes at least some numerical data. The prompt may indicate a question provided by a user using natural language, such as "How many sales representatives in the west region recorded average sales above $500,000 in 2023?" The system may process the prompt and provide the prompt as input to an agent orchestrator to select one or more generative artificial intelligence (AI) agents to perform analytics tasks corresponding to the information. In some implementations, the processing of the prompt may include detecting an intent associated with the prompt, performing one or more data disambiguation operations, performing one or more prompt disambiguation operations, performing one or more prompt optimization operations, or a combination thereof, to modify the prompt such that the prompt is more useful to the agent orchestrator (e.g., so that performance of the agent orchestrator is improved as compared to using the unmodified user prompt). The agent orchestrator may include a trained AI classifier configured to select the one or more generative AI agents from multiple available generative AI agents that are configured to perform analytics tasks on numerical and structured data. As non-limiting examples, the generative AI agents may include a CSV agent, an SQL agent, a Spark agent, a semantic search agent, or the like. The agent orchestrator may select the generative AI agents based on agent features associated with the available generative AI agents, intent features associated with the intent determined from the user prompt, data schema features associated with the structured data set, or a combination thereof, and optionally based on a greedy parameter to enable exploration of agents with lower scores based on current knowledge but that may have the potential to yield better results.

After the agent orchestrator selects one or more of the generative AI agents, the system may execute an ensemble model that includes the selected generative AI agents. Execution of the ensemble model may generate a response to the user prompt based on the structured data set. The ensemble model may rank the responses of the selected generative AI agents based on various criteria and determine to output either the response from the highest ranked agent or a combination of responses from multiple agents as the response to the user prompt. The ensemble model may also provide a user with a step-by-step performed by the ensemble model to increase user understanding of the analytics tasks and user confidence of the response. The system may include an adaptive visualization engine that is configured to provide user-friendly visualization of the response from the ensemble model. To illustrate, the adaptive visualization engine may output a graphical user interface (GUI) that includes one or more elements based on the response. For example, the GUI may include a chart, a graph, a table (or portion thereof), or other visual elements in addition to text output and/or numerical output to provide a user with information to enable efficient derivation of insights and decision-making capabilities. Such an output may have greater utility than a wholly text or numerical output, thereby improving a user experience and enabling easier and more accurate decision-making and understanding of insights unlocked from structured data without requiring the user to manually analyze the structured data or to be trained in the use of a particular application interface. The system may also be configured to perform continuous learning such that user feedback and preferences may be provided based on the response, and the system may adjust parameters of the prompt processing and agent selection processes to increase accuracy and user-satisfaction with the generative AI-assisted analytics performed by the system.

In a particular aspect, a method for generative artificial intelligence-assisted analytics of structured data sets includes receiving, by one or more processors, a prompt including information associated with a structured data set. The structured data set includes at least some numerical data. The method also includes providing, by the one or more processors, the prompt as input to an agent orchestrator to select one or more generative artificial intelligence (AI) agents to perform analytics tasks corresponding to the information. The agent orchestrator includes a trained AI classifier configured to select the one or more generative AI agents from a plurality of generative AI agents. The method includes executing, by the one or more processors, an ensemble model to generate a response to the prompt based on the structured data set. The ensemble model includes the one or more generative AI agents. The method further includes outputting, by the one or more processors, a graphical user interface (GUI) that includes one or more elements based on the response.

In another particular aspect, a system for generative artificial intelligence-assisted analytics of structured data sets includes a memory and one or more processors communicatively coupled to the memory. The one or more processors are configured to receive a prompt comprising information associated with a structured data set. The structured data set includes at least some numerical data. The one or more processors are also configured to provide the prompt vector as input data to a first machine learning (ML) model to generate a result vector. The result vector output by the first ML model, for the prompt vector, is a similar vector from a latent space representation of a vector database that is generated from the first-party data. The one or more processors are configured to perform a comparison of the prompt vector to the result vector. The one or more processors are further configured to, based on a result of the comparison, output a sourced digital content item or an unsourced digital content item. The sourced digital content item is generated by a one or more generative ML models based on the prompt vector. The unsourced digital content item is generated by the one or more generative ML models based on a custom prompt, the custom prompt based on the prompt vector.

In another particular aspect, a non-transitory computer-readable storage device stores instructions that, when executed by one or more processors, cause the one or more processors to perform operations for generative artificial intelligence-assisted analytics of structured data sets. The operations include generating a prompt vector based on a user prompt. The user prompt represents a question to be answered based on information indicated by first-party data. The operations also include providing the prompt vector as input data to a first machine learning (ML) model to generate a result vector. The result vector output by the first ML model, for the prompt vector, is a similar vector from a latent space representation of a vector database that is generated from the first-party data. The operations include performing a comparison of the prompt vector to the result vector. The operations further include, based on a result of the comparison, outputting a sourced digital content item or an unsourced digital content item. The sourced digital content item is generated by a one or more generative ML models based on the prompt vector. The unsourced digital content item is generated by the one or more generative ML models based on a custom prompt, the custom prompt based on the prompt vector.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which:

FIG. 5 is a flow diagram illustrating an example process flow for performing data disambiguation according to one or more aspects;

FIG. 12 is a flow diagram illustrating an example of a method for supporting generative AI-assisted analytics of structured data sets according to one or more aspects.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Figure 1:
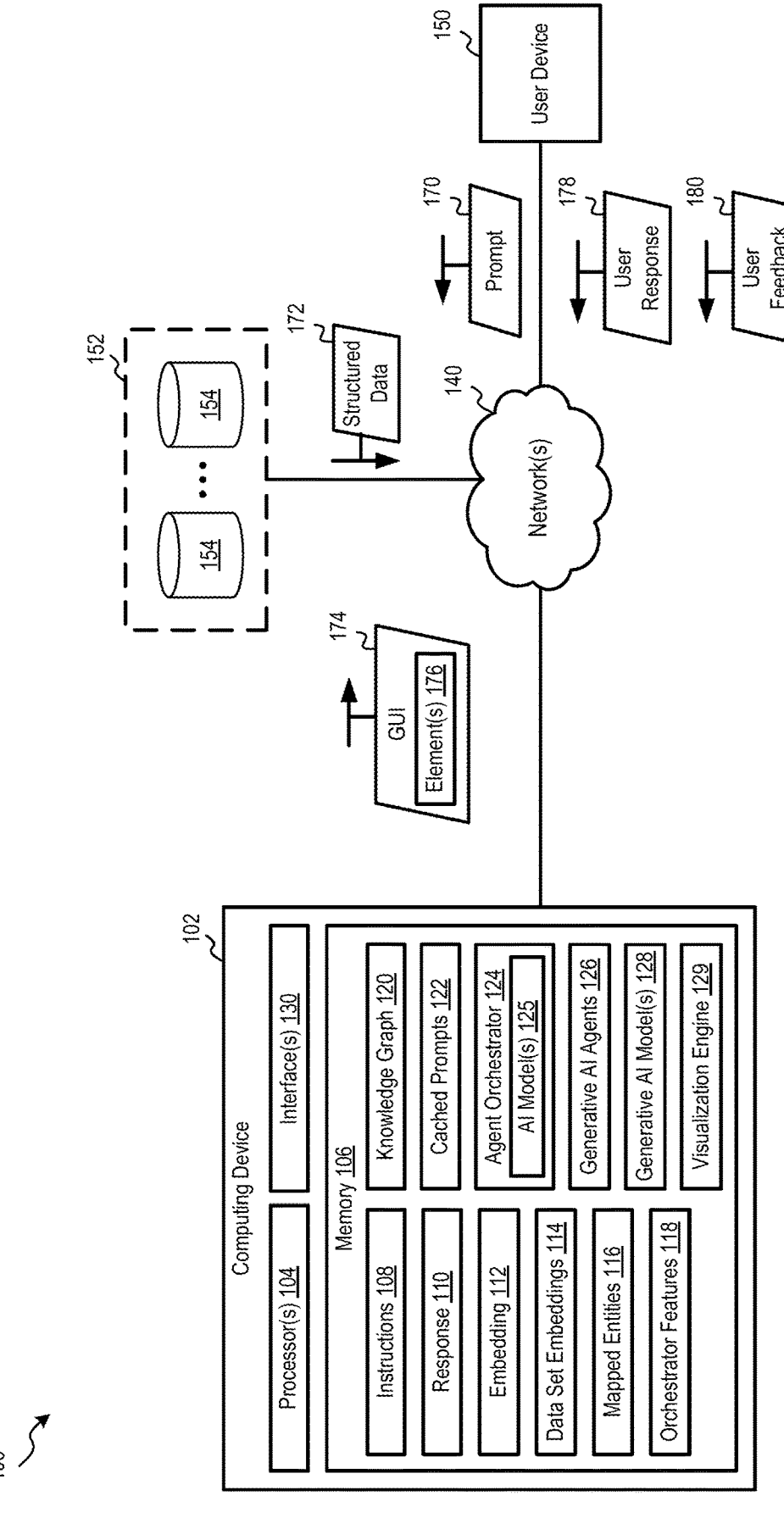
FIG. 1 is a block diagram of an example of a system that supports generative artificial intelligence (AI)-assisted analytics of structured data sets according to one or more aspects.

Referring to FIG. 1, an example of a system that supports generative artificial intelligence-assisted analytics of structured data sets according to one or more aspects of the present disclosure is shown as a system 100. The system 100 may be configured to generate a response to a user prompt by leveraging generative artificial intelligence (AI) agents to perform analytics of at least partially numerical structured data. As shown in FIG. 1, the system 100 includes a computing device 102, a user device 150, one or more data sources (referred to herein collectively as "data sources 152"), and one or more networks 140. In some implementations, the system 100 may include more or fewer components than are shown in FIG. 1, such as additional client devices, additional data sources, network-based or cloud-based machine learning or artificial intelligence pools, or the like, or the user device 150 may be omitted (and the corresponding operations performed by the computing device 102), as non-limiting examples.

The computing device 102 may be configured to perform one or more operations herein to support intelligent digital content generation. For example, the computing device 102 may include or correspond to a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof, as non-limiting examples. In the implementation shown in FIG. 1, the computing device 102 includes one or more processors 104, a memory 106, and one or more communication interfaces 130.

It is noted that functionalities described with reference to the computing device 102 are provided for purposes of illustration, rather than by way of limitation and that the exemplary functionalities described herein may be provided via other types of computing resource deployments. For example, in some implementations, computing resources and functionality described in connection with the computing device 102 may be provided in a distributed system using multiple servers or other computing devices, or in a cloud-based system using computing resources and functionality provided by a cloud-based environment that is accessible over a network, such as the one of the one or more networks 140. To illustrate, one or more operations described herein with reference to the computing device 102 may be performed by one or more servers or a cloud-based system that communicates with one or more client or user devices, such as the user device 150.

The one or more processors 104 may include one or more microcontrollers, application specific integrated circuits (ASICs), field programmable gate arrays (FPGAs), central processing units (CPUs) and/or graphics processing units (GPUs) having one or more processing cores, or other circuitry and logic configured to facilitate the operations of the computing device 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the computing device 102 may be stored in the memory 106 as instructions 108 that, when executed by the one or more processors 104, cause the one or more processors 104 to perform the operations described herein with respect to the computing device 102, as described in more detail below. Additionally, the memory 106 may be configured to store a response 110, an embedding 112, data set embeddings 114, mapped entities 116, orchestrator features 118, a knowledge graph 120, cached prompts 122, an agent orchestrator 124, generative AI agents 126, one or more generative AI models (referred to herein collectively as "generative AI models 128"), and a visualization engine 129. The generative AI agents 126 and/or the generative AI models 128 may include or be implemented as one or more neural networks (NNs) or one or more support vector machines (SVMs). In some other implementations, the generative AI agents 126 and/or the generative AI models 128 may include or be implemented as other types of machine learning (ML) or artificial intelligence (AI) models or logic, as further described herein. Illustrative aspects of the response 110, the embedding 112, the data set embeddings 114, the mapped entities 116, the orchestrator features 118, the knowledge graph 120, the cached prompts 122, the agent orchestrator 124, the generative AI agents 126, the generative AI models 128, and the visualization engine 129 are described in more detail below. Although shown as being stored in memory 106, in some other implementations, the system 100 may include one or more databases integrated in or communicatively coupled to the computing device 102 (e.g., communicatively coupled to the one or more processors 104) that are configured to store any of the response 110, the embedding 112, the data set embeddings 114, the mapped entities 116, the orchestrator features 118, the knowledge graph 120, the cached prompts 122, the agent orchestrator 124, the generative AI agents 126, one or more parameters corresponding to the generative AI models 128, the visualization engine 129, or a combination thereof.

The one or more communication interfaces 130 may be configured to communicatively couple the computing device 102 to the one or more networks 140 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the computing device 102 includes one or more input/output (I/O) devices (not shown in FIG. 1) that include one or more display devices, a keyboard, a stylus, one or more touchscreens, a mouse, a trackpad, a microphone, a camera, one or more speakers, haptic feedback devices, or other types of devices that enable a user to receive information from or provide information to the computing device 102. In some implementations, the computing device 102 is coupled to a display device, such as a monitor, a display (e.g., a liquid crystal display (LCD) or the like), a touch screen, a projector, a VR display, an AR display, an XR display, or the like. In some other implementations, the display device is included in or integrated in the computing device 102. Alternatively, the computing device 102 may be configured to provide information to support display at one or more other devices, such as the user device 150, as a non-limiting example.

As briefly described above, the computing device 102 may be communicatively coupled to one or more other devices or systems via the one or more networks 140, such as the user device 150 and the data sources 152. The user device 150 is configured to communicate with the computing device 102 via the one or more networks 140 to enable user interaction with the services provided by the computing device 102. For example, the user device 150 may display information related to enabling entry of user prompts, displaying a user interface that includes information based on a response to a prompt and visual elements that represent the information, portions of structured data sets, other information or visual elements, or a combination thereof. The user device 150 may include or correspond to a computing device, such as a desktop computing device, a server, a laptop computing device, a personal computing device, a tablet computing device, a mobile device (e.g., a smart phone, a tablet, a PDA, a wearable device, and the like), a VR device, an AR device, an XR device, a vehicle (or component(s) thereof), an entertainment system, another computing device, or a combination thereof, as non-limiting examples. The user device 150 may include one or more processors, a memory, and one or more communication interfaces, similar to the computing device 102. Although depicted as including a single user device 150, the system 100 is not so limited. For example, the system 100 may include a plurality of user devices 150 that enable multiple users to interact with the services provided by the computing device 102.

The data sources 152 may include one or more databases, cloud storage locations, networked memory devices, computing devices or servers, other sources capable of storing structured data, or a combination thereof. The data sources 152 may be owned and maintained by an entity that controls the computing device 102, the data sources 152 may include third-party or external data sources, the data sources 152 may include publicly available data sources (e.g., via the Internet), or any combination thereof. The data sources 152 may be configured to store a structured data set 154. The structured data set 154 may include at least some numerical data, and in some implementations, multiple types of data. For example, the structured data set 154 may include numerical data, text data, Boolean data, string data, binary data, other types of data, or a combination thereof. The structured data set 154 may be organized according to one or more data schema that specify one or more fields of one or more data entries of the structured data set 154, format of one or more tables of the structured data set 154, or any other type of structured formatting of data across one or multiple file or container types. In some implementations, the structured data set 154 includes a plurality of tables, and each table of the plurality of tables is organized according to one of a plurality of table types that each have associated fields, and such organization may be indicated by one or more data schemas.

During operation of the system 100, the computing device 102 may receive a prompt 170 from the user device 150. The prompt 170 may include information associated with the structured data set 154, which may include at least some numerical data. For example, a user of the user device 150 may access an application executed by user device 150 to enable the user to enter a question in natural language, as compared to using a coding language or interacting with a dashboard with limited input features, and the prompt 170 may include or represent the user's question. The question may be simple or complex, and may be related to information stored in the structured data set 154 that requires the performance of at lease some mathematical, statistical, or other analytical operations. In some implementations, the structured data set 154 includes comma-separated value (csv) files or spreadsheet files (e.g., Microsoft® Excel® files), and such files may store data in tables or lists according to the respective file format. The structured data set 154 may include multiple file types or a single file type, and may include or be organized according to multiple schemas, multiple data table formats, multiple data types, or a combination thereof. As such, conventional analytics applications or generative AI models may have difficulty analyzing data from the structured data set 154 in order to answer the user question represented by the prompt 170. However, the computing device 102 may be configured to optionally pre-process the prompt 170 and/or the structured data set 154 and to use the agent orchestrator 124 to select one or more of the generative AI agents 126 for providing an accurate and efficient response to the prompt 170, as further described herein.

The optional pre-processing operations performed by the computing device 102 may include performing one or more data disambiguation operations, one or more query disambiguation operations, one or more prompt disambiguation operations, or a combination thereof. The data disambiguation operations, the query disambiguation operations, the prompt disambiguation operations, or a combination thereof, may be performed based on the prompt 170 and/or structured data 172 retrieved from the structured data set 154 to modify the prompt 170 prior to the prompt 170 being provided as input to the agent orchestrator 124 or to generate the data set embeddings 114. Such disambiguation operations may provide a prompt that is more likely to be understandable by the generative AI agents 126 selected by the agent orchestrator 124 and to be more useful to the agent orchestrator 124 in selecting which of the generative AI agents 126 for performance of analytical functions based on the prompt 170.

One type of optional disambiguation operations performed by the computing device 102 include data disambiguation operations to account for or improve performance of the generative AI agents 126 when performing analytics on the structured data 172. Other generative AI agents, such as large language model (LLM)-based agents, are often not able to handle a complex dataset due to multiple problems. For example, when a dataset has more than 10-15 columns, other LLM-based agents may "hallucinate" (e.g., return incorrect data in response to a question) or choose wrong fields from the dataset to answer questions. As another example, poorly labelled columns, such as abbreviated or proprietary metric-labeled columns, may cause other LLM-based agents to hallucinate or answer incorrectly. Conventional LLM-based agents also have reduced answer accuracy for questions that require personalization or slicing and filtering of data combined with calculations. Two examples of these types of questions that are difficult for other LLM-based agents to handle without hallucinating or providing incorrect answers are: "How do my average sales totals compare to other salesmen in my region?" and "How do the average sales of the top 5 percent of salesmen compare to the bottom 5 percent?"

To enable more accurate processing of the prompt 170, the computing device 102 may perform data disambiguation operations based on the structured data set 154 and then query disambiguation operations based on the prompt 170. Such data disambiguation operations may include generating an embedding based on the prompt 170 and performing a semantic search for stored table-level and field-level embeddings that are most similar to the embedding, in order to modify the prompt 170 based on the identified embeddings to be more likely to be accurately processed by the generative AI agents 126. For example, the computing device 102 may generate the embedding 112 based on the prompt 170 and use the embedding 112 for performing semantic searches (or other matching operations) against the data set embeddings 114. Generating the embedding 112 may include extracting one or more natural language processing (NLP) or other features from the prompt 170 and generating a vector (e.g., an embedding) from the extracted features. The particular features extracted from the prompt 170 may be based on the data set embeddings 114 generated during performance of the data disambiguation operations (as further described below), NLP operations, or the like. After the embedding 112 is generated, the computing device 102 may perform a first semantic search on table-level embeddings of the data set embeddings 114 to identify one or more highest ranked table-level embeddings that are most similar to the embedding 112. The identified table-level embeddings correspond to one or more data tables of the structured data set 154 and may be generated during an offline embedding generation process, as further described herein. After identifying one or more table-level embeddings, the computing device 102 may perform a second semantic search on field-level embeddings of the data set embeddings 114 to identify one or more highest ranked field-level embeddings that are most similar to the embedding 112. The computing device 102 may perform the second semantic search over the subset of field-level embeddings that correspond to one or more fields included in the data tables that correspond to the identified table-level embeddings. After identifying one or more field-level embeddings, the computing device 102 may modify the prompt 170 based on the one or more data tables, the one or more fields, or both. For example, the computing device 102 may replace a word or phrase of the prompt 170 with a field name from the identified fields (e.g., that correspond to the identified field-level embeddings), or the computing device 102 may add text from a description of a table from the identified tables (e.g., that correspond to the identified table-level embeddings) to the prompt 170. As a non-limiting example, if the prompt 170 includes the question "How do the average sales of the top 5 percent of salesmen compare to the bottom 5 percent?", the computing device 102 may access a table-level embedding that corresponds to a yearly sales table to determine that no field in the data table stores percentages, and based on a description of the data table that indicates entries correspond to sales for individual sales representatives, the computing device 102 may determine the total number of sales representatives in the data table and modify the prompt 170 to replace "top 5 percent" and "bottom 5 percent" with "top 10 sales representatives" and "bottom 10 sales representatives", respectively, if the data table includes entries for 200 sales representatives. Additional details of data disambiguation are described further herein with reference to FIG. 5.

To generate the data set embeddings 114, the computing device 102 may perform an embedding process that includes data disambiguation operations based on the structured data set 154. This process may be referred to as an "offline" process as it is not performed during processing of a prompt from a user device and instead can be done as a pre-processing step upon upload of the structured data set 154 to enable schema understanding for use in disambiguating input prompts. The embedding process may include the computing device 102 accessing one of the generative AI models 128, which may be included or integrated in, or communicatively coupled to, the computing device 102, to generate one or more field descriptions based on fields of one or more data schema associated with the structured data set 154. For example, a field description for an average sales field may include "This field indicates the average monthly sales of a sales representative over a yearly period." The embedding process may also include the computing device 102 generating the field-level embeddings of the data set embeddings 114 based on the generated field descriptions. The computing device 102 may group semantically similar field-level embeddings into a plurality of additional tables of the structured data set 154 such that the additional tables are grouped based on similar field groupings, similar field values, or both. For example, some fields of each entry may be copied and used as entries to create a new table. Examples of this process are further described herein with reference to FIG. 3. The embedding process performed by the computing device 102 may also include accessing one of the generative AI models 128 to generate one or more table descriptions based on these additional generated tables. For example, the computing device 102 may provide a prompt that includes fields in a newly generated table as input to the generative AI models 128 to generate a description of the table, as further described with reference to FIG. 3. After generating the table descriptions of the additional tables, the computing device 102 may extract features from the descriptions of the original tables, the additional tables, or both, to generate the table-level embeddings of the data set embeddings 114. In this manner, an offline process may be performed by the computing device 102 to generate table-level embeddings and field level embeddings, referred to collectively as the data set embeddings 114, to be used to match to embeddings derived from input prompts. These embeddings may enable detection of descriptions in prompts that are similar to known descriptions related to the structured data set 154, and can be used to modify input prompts to more clearly refer to information related to fields and tables of the structured data set 154, which may improve the accuracy of analytics functions performed by the generative AI agents 126. Additional details of generating these embeddings are described further herein with reference to FIG. 4.

Another type of optional disambiguation operations performed by the computing device 102 include prompt disambiguation operations to account for or improve performance of the generative AI agents 126 when performing analytics on the structured data 172. Prompt disambiguation may improve performance due to the varied nature of user prompts, questions, and queries. To illustrate, user prompts can be varied, incomplete, and incorrect, which can lead to undesired results being output by the generative AI agent 126. As an example, a user prompt may contain spelling errors leading to misunderstanding by LLM-based agents, such as in the following (corrected) prompt "What is the neat (mean) attrition rate?" As another example, a user prompt can have semantically different meaning than intended, such as in the following example prompt "What is the average sales in the past 3 months" as compared to "What is the average sales in the last 3 months." In this example, does the user mean the most recent 3 months to the current time, or the last 3 months in a data table? As yet another example, a user prompt can have missing context, such as the following example prompt "What is the current attrition rate?" which may have a different context depending on when the prompt is entered, as compared to the more specific prompt "What is the current attrition rate as of August, 2023?"

To enable more accurate processing of the prompt 170, the computing device 102 may perform prompt disambiguation operations based on the prompt 170. The prompt disambiguation operations may include performing spell check, performing grammar check, and other automated revisions. The prompt disambiguation operations may also be performed to determine an intent of an input prompt, to perform entity mapping to determine whether one or more entities that correspond to the intent are present (or missing) from the input prompt, and modifying the input prompt based on one or more of the mapped entities to more clearly define the prompt. If one or more entities are missing, the input prompt may be modified to compensate for the missing entity or additional information may be requested from the user. To illustrate, the computing device 102 may determine an intent that corresponds to the prompt 170. The intent may be determined based on NLP operations, intent matching to prestored intents, using trained ML and/or AI models, or the like. Once the computing device 102 determines an intent associated with the prompt 170, the computing device 102 may identify an entity mapping from the mapped entities 116 that most closely matches the determined intent. For example, the mapped entities 116 may include multiple entries that each include an intent and one or more entities that are mapped to that intent in terms of being included in a prompt that has the respective intent. As a non-limiting example, if the intent is to retrieve geographically specific failure data from the structured data set 154, an entry in the mapped entities 116 may include an indicator of the intent, a geographic region entity, a failure type entity, and a metric entity, such that a prompt that has the same intent is expected to include a reference to a particular geographic region (e.g., a location of the failure being queried), a particular failure type (e.g., a type of the failure being queried), and a particular metric (e.g., a metric that indicates the failure being queried). After identifying a mapping from the mapped entities 116 that is most similar to the intent associated with the prompt 170, the computing device 102 may perform entity extraction based on the identified entity mapping to extract one or more entities from the prompt 170.

If at least one entity of the identified entity mapping that is not included in the entities extracted from the prompt 170, the computing device 102 may modify the prompt 170 based on the at least one entity that is missing. In some implementations, modifying the prompt 170 includes accessing, by the computing device 102, one of the generative AI models 128 to generate at least one contextual phrase based on the at least one entity. This at least one contextual phrase may then be added to the prompt 170. For example, if the prompt 170 is "Give me the average speed of top 3 runners", and an entity that is mapped to a similar intent but that is not included in the prompt 170 is a "date/time" entity, the computing device 102 may provide a prompt to one of the generative AI models 128 to cause output of text content that indicates a date of the entry of the prompt, such as "on Nov. 5, 2023", and this may be added to the prompt 170 to generate "Give me the average speed of the top 3 runners on Nov. 5, 2023" as the modified prompt 170. Additionally, or alternatively, if at least one entity from the entity mapping is not detected in the prompt 170, the computing device may cause display of a GUI that includes a request for additional information associated with the at least one entity, and upon receiving a user response 178 indicating the additional information, the computing device 102 may add the additional information to the prompt 170. For example, if the prompt 170 includes "Tell me the average sales at the last 3 events", the computing device may request additional information by causing display, to the user, of "Do you mean the last 3 events to occur, or the 3 events with the lowest sales?" Based on this request, the user may submit "The last 3 events to occur" as the user response 178, and the computing device 102 may modify the prompt 170 to include "Tell me the average sales at the last 3 events to occur." Additional details of prompt disambiguation operations are described herein with reference to FIG. 6.

In addition, or in the alternative, to performing data disambiguation, query disambiguation, and/or prompt disambiguation, the computing device 102 may perform one or more prompt optimization operations based on the prompt 170. The prompt optimization operations may include, prior to the prompt 170 being provided as the input to the agent orchestrator 124, modifying or replacing the prompt 170 with a recently cached prompt that was successfully processed and used to provide a response. To illustrate, the computing device 102 may compare the prompt 170 to the cached prompts 122 associated with recently performed analytics tasks to identify a most similar prompt from the cached prompts 122. The comparison may be based on embeddings or other representations of the prompts, and may be performed to determine a similarity score, such as a cosine similarity score as a non-limiting example. After identifying the most similar of the cached prompts 122, the computing device 102 may replace the prompt 170, or a portion thereof (e.g., such as one or more entity names, one or more field names, one or more descriptive phrases, etc.) with the most similar of the cached prompts 122, or a portion thereof. Use of the cased prompts 122 may save the time and resources costs of calling an LLM API for similar prompts, which improves the overall efficiency of the system 100.

After optionally performing the data disambiguation operations, the prompt disambiguation operations, and/or the prompt optimization operations described above, the computing device 102 may provide the prompt 170 (e.g., the modified prompt) as input to the agent orchestrator 124 to select one or more of the generative AI agents 126 to perform analytics tasks corresponding to the information included in the prompt 170. The generative AI agents 126 include any types of generative AI agents that are capable of performing analytics or mathematical operations on input data, such as a comma-separated value (CSV) agent, a structured query language (SQL) agent, a Spark agent, a Spark dataframe agent, a SPARQL agent, a Pandas dataframe agent, a semantic search agent, a visualization agent (e.g., the visualization engine 129), other generative AI-based analytics agents, or a combination thereof. The agent orchestrator 124 may be configured to select one or more of the generative AI agents 126 for execution based on characteristics of the prompt 170, the structured data 172 retrieved based on the prompt 170 (e.g., characteristics of the structured data set 154), other information, or a combination thereof. In some implementations, the agent orchestrator 124 includes, or is able to access, one or more AI models (referred to herein collectively as "the AI models 125") that are trained to perform the tasks described with reference to the agent orchestrator 124. For example, the AI models 125 may include a trained AI classifier or ML classifier that is configured to select one or more of the generative AI agents 126 based on the prompt 170 and the structured data 172.

In some implementations, the agent orchestrator 124 may be trained to select one or more of the generative AI agents 126 based on the orchestrator features 118 that include agent features associated with the generative AI agents 126, intent features associated with the prompt 170, data schema features associated with the structured data set 154, other information, or a combination thereof. For example, the agent orchestrator 124 may identify or extract certain features (e.g., the orchestrator features 118) from the prompt 170, the structured data set 154 (or descriptions thereof), and descriptions and historic performance of the generative AI agents 126, and based on the orchestrator features 118, the agent orchestrator 124 may select a single agent, or multiple agents, of the generative AI agents 126 that are likely to have the best performance in performing analytics tasks based on the prompt 170. The agent features included in the orchestrator features 118 may include expertise level associated with the generative AI agents 126, historical performance metrics associated with the generative AI agents 126, response times recorded during operation of the generative AI agents 126, other information or metrics related to the generative AI agents 126, or a combination thereof. The intent features included in the orchestrator features 118 may include intent type associated with an intent of the prompt 170, intent complexity associated with the intent of the prompt 170, other characteristics of the intent of the prompt 170, or a combination thereof. The data schema features included in the orchestrator features 118 may include data complexity associated with the structured data set 154, data type(s) associated with the structured data set 154, data size(s) associated with the structured data set 154, other characteristics of the structured data set 154, or a combination thereof. The agent orchestrator 124 may weight the orchestrator features 118 and calculate an agent score for each of the generative AI agents 126, and the agent orchestrator 124 may generate a recommendation that indicates one or more of the highest scoring generative AI agents. In some implementations, the agent orchestrator 124 includes a generative AI model (of the generative AI models 128) that is configured to output the recommendation based on input that includes the orchestrator features 118. Additional details of agent orchestrator operations and the agent selection process are described further herein, with reference to FIGS. 8-9.

After the agent orchestrator 124 generates the recommendation that indicates one or more of the generative AI agents 126, the computing device 102 may create (e.g., configure) and execute an ensemble model of the recommended generative AI agents based on the prompt 170 and the structured data 172 to generate the response 110. For example, if the selected generative AI agents include a CSV agent and a Spark agent, the computing device may ensemble the CSV agent and the Spark agent together as an ensemble AI model that receives the prompt 170 and the structured data 172 and that outputs an ensemble output as the response 110. The ensemble output may be a combination of an output of the CSV agent and an output of the Spark agent, a higher ranked of the two outputs, or any other type of ensemble model output that is based on multiple individual model (e.g., generative AI agent) outputs. In some implementations, the agent orchestrator 124 may generate a recommendation that indicates one or more highest scoring generative AI agents during a first time period (e.g., an "exploitation phase"), and the agent orchestrator 124 may generate a recommendation that includes one or more differently selected generative AI agents from the generative AI agents 126 according to a greedy algorithm parameter during a second time period (e.g., an "exploration phase"). For example, when the agent orchestrator 124 determines, based on the greedy algorithm parameter, that it is in the exploration phase, the agent orchestrator 124 may randomly or pseudo randomly select one or more of the generative AI agents 126 to be included in the ensemble model. This introduction of randomness into the agent selection may prevent the agent orchestrator 124 from selecting the same models over and over when other models may perform as well given changes in distribution of data over time. The greedy algorithm parameter may have a value that is selected to introduce a target level of randomness into the agent selection process. Additionally or alternatively, the ensemble model may be configured to join at least two of multiple data tables included in the structured data 172 according to a selected join strategy to generate a results data table. For example, if the structured data set 154 includes multiple tables, generative AI agents that have high performance for each of the tables may be selected for inclusion in the ensemble model, which may enable joining of the multiple tables into a single combined results table, according to a join strategy of the highest scoring generative AI agents. Additional details related to an ensemble model of generative AI agents are further described herein, with reference to FIG. 10.

After the computing device 102 has executed the ensemble model of one or more of the generative AI agents 126 and generated the response 110, the computing device 102 may output a graphical user interface (GUI) 174 that includes one or more visual elements (referred to herein collectively as "the visual elements 176") based on the response 110. The visual elements 176 may include one or more visual representations of the response 110, and the visual elements 176 may be included with text data generated by the generative AI models 128, a combination of text and numerical data generated by the ensemble model of some of the generative AI agents 126, portions of the structured data 172, other information, or a combination thereof. As such, the GUI 174 may include a general question and answer dashboard, the visual elements 176, and computational metrics to provide natural language text, visual representations, and metrics that answer the question(s) included in the prompt 170 to the user of the user device 150, to enable quick and efficient understanding by the user, thereby enabling fast and effective decision making based on insights drawn from the structured data set 154. In some implementations, the visual elements 176 are generated by the visualization engine 129, which may include or correspond to a visualization agent (e.g., a generative AI agent or other application) that is configured to generate visual representations of data. The visual elements 176 (e.g., the one or more visual representations) may include graphs, charts, tables, other statistical or mathematical visual representations, or a combination thereof. For example, if the prompt 170 includes "Who are the top three sales representatives in each region, and show me a chart of their percentage of overall sales", the GUI 174 may include the names of the top three sales representatives over the previous year, and the visual elements 176 may include a pie chart of total sales revenue per representative, with the top three representatives color coded or highlighted. In some implementations, in which the ensemble model of the generative AI agents 126 joins multiple tables to form a combined table, the visual elements 176 may include the combined table, thereby enabling the processing and answering of prompts across multiple data tables of structured data sets.

In some implementations, the computing device 102 may be configured to support a continuous learning process to improve the performance of the agent orchestrator 124 and the generative AI agents 126 over time. To support this continuous learning, the computing device 102 may maintain a knowledge graph 120, such as an intent taxonomy knowledge graph, that is based on intents and sub-intents related to historical prompts and responses that are received and generated by the computing device 102. For example, historic user prompts received by the computing device 102 may have been processed to determine related intents, and sub-intents, and these intents and sub-intents may be stored, along with information relating to user feedback of corresponding responses, in the knowledge graph 120. To support the continuous learning, the computing device 102 may provide, via the GUI 174, a request for user feedback associated with the response 110 (e.g., associated with the GUI 174 and the visual elements 176), such as via a text based prompt that includes "Was this answer helpful?" or "Please rate the accuracy of this response and provide any feedback for improving your results." In response to the request, the user of the user device 150 may provide user input as user feedback 180 that indicates the user's feedback and any preferences associated with the prompt 170 and the response 110, the GUI 174, and/or the visual elements 176. For example, the user feedback 180 may indicate an accuracy score and a preference for a line graph that is related to a user prompt that requested performance of some statistical analysis and "a graph displaying the results." The computing device 102 may modify the knowledge graph 120 based on the prompt 170, the response 110, and the user feedback 180. For example, one or more nodes may be added to the knowledge graph 120 based on preferences indicated by the user feedback 180, one or more weights between nodes may be decreased based on a low score indicated by the user feedback 180 and the prompt 170, or the like. Additional details of continuous learning and use of a knowledge graph are described further herein, with reference to FIG. 11.

As described above, the system 100 supports generative artificial intelligence-assisted analytics of structured data sets. For example, the computing device 102 may leverage an ensemble model of one or more of the generative AI agents 126 to generate the response 110 based on the prompt 170. The selected ones of the generative AI agents 126 may perform analytics tasks based on the prompt 170 to analyze the structured data set 154, and the response 110 may be used to generate the GUI 174 that includes the visual elements 176, such as chart(s), graph(s), table(s), or the like, that are easier to understand and derive insights from than simply outputting the structured data 172. Such an output (e.g., the GUI 174 including the visual elements 176) may have greater utility than a wholly text or numerical output (e.g., the structured data 172), thereby improving a user experience associated with the system 100 and enabling easier and more accurate decision-making and understanding of insights unlocked from the structured data set 154 without requiring the user to manually analyze the structured data set 154 or to be trained in the use of a particular application interface. The system 100 may also be configured to perform continuous learning such that the user feedback 180 may be used to adjust parameters of the prompt processing and agent selection processes performed by the computing device 102 to increase accuracy and user-satisfaction with the generative AI-assisted analytics performed by the system 100. As such, the system 100 supports efficient, automated analysis of multiple files and sheets of structured data sets, in addition to automated data schema understanding, which can be used to support structured data analytics in a variety of fields, including finance, health, law, sales, human resources and employment, and the like. The functionality is provided in a user-friendly and easy-to-use manner through the use of GUIs and natural language prompts, which can be converted to SQL queries for selection, aggregation, and joining of multiple tables, or which can be used to perform statistical analysis such as identifying trends, standard deviations, and the like. Accordingly, the system 100 enables generative AI-based analytics support that can provide statistical and numerical analysis of structured data sets, unlike typical generative AI models such as LLMs that are unsuited for performing analytics on numerical data. The responses and visual elements output by the system 100 may empower managers and executives, and their workforce, to derive insights and to make decisions based on their organizations' structured data. This may assist business leaders and executives to find quick insights based on data-driven intelligence, straightforward data visualization and real-time reporting commentary, thus accelerating their decision making, without having to be trained in analytics or in using analytics applications. Instead, the system 100 is responsive to natural language prompts, both simple and complex, instead of using query languages or a large number of interactive controls. The system 100 is also scalable and adaptable due to leveraging the agent orchestrator 124, which through continuous learning is able to select the best generative AI agent for a particular prompt as new agents and the latest analytics tools are continually added and upgraded. As such, the system 100 provides a centralized data and analytics management interface that reduces human assistance for unlocking insights from structured data and that allows flexibility in analytics infrastructure to enable changes and upgrades with minimal effort by the users.

Figure 2:
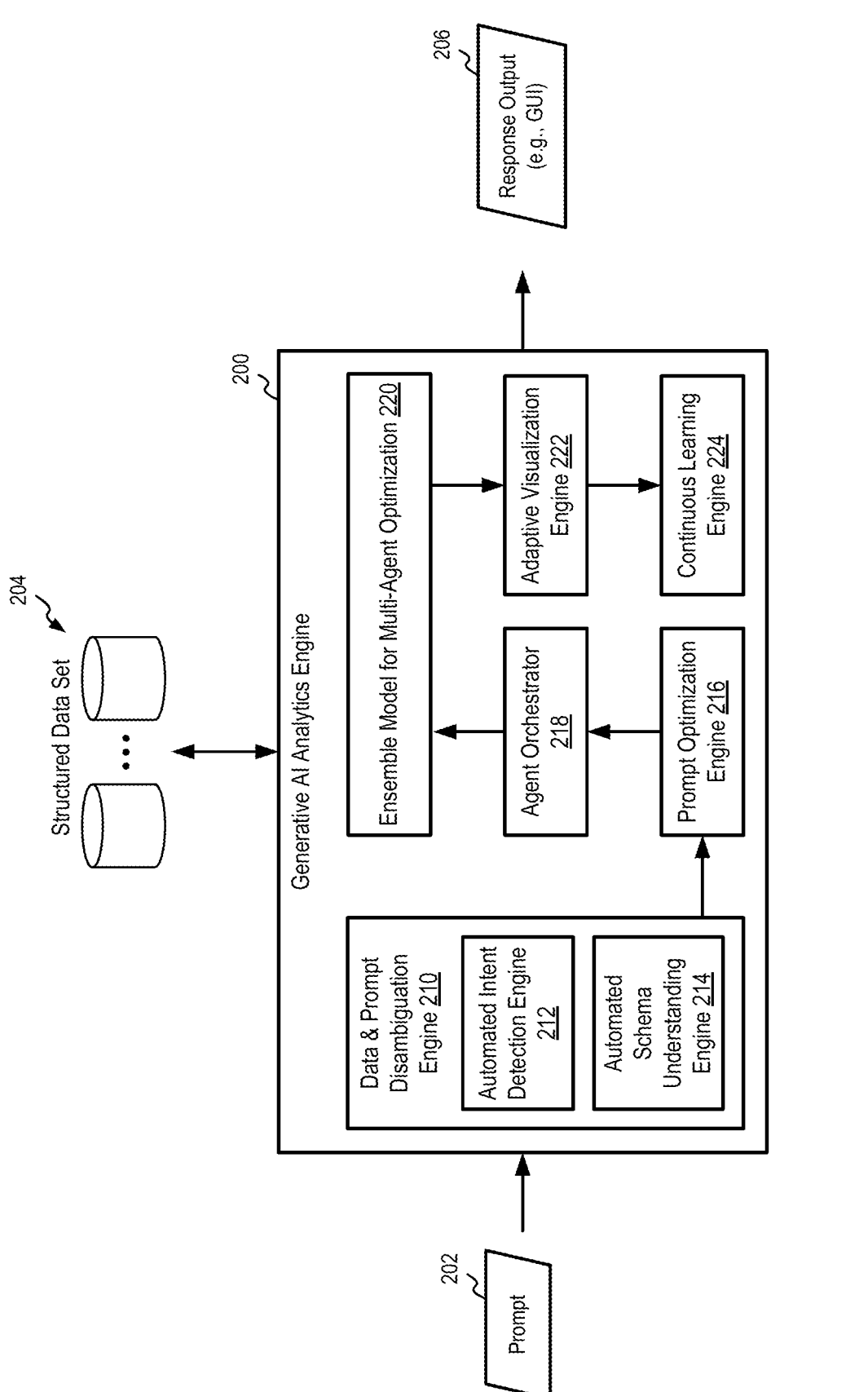
FIG. 2 is a block diagram of an example of a generative AI analytics engine according to one or more aspects.

Referring to FIG. 2, an example of a generative AI analytics engine according to one or more aspects of the present disclosure is shown as a generative AI analytics engine 200. In some implementations, the generative AI analytics engine 200 may be incorporated or integrated within the computing device 102 of FIG. 1, or one or more components of the generative AI analytics engine 200 may include or correspond to one or more components of the computing device 102 of FIG. 1. The generative AI analytics engine 200 may be configured to receive a prompt 202 (e.g., a user prompt) and to generate a response 206 based on the prompt 202 and a structured data set 204, as further described below.

In the example shown in FIG. 2, the generative AI analytics engine 200 includes a data and prompt disambiguation engine (referred to herein as a "disambiguation engine 210"), a prompt optimization engine 216 coupled to the disambiguation engine 210, an agent orchestrator 218 coupled to the prompt optimization engine 216, an ensemble model 220 for multi-agent optimization configured by the agent orchestrator 218, an adaptive visualization engine 222 that receives an output of the ensemble model 220, and a continuous learning engine 224 coupled to the adaptive visualization engine 222.

The disambiguation engine 210 may be configured to receive the prompt 202 (e.g., a user prompt indicating a question that includes the performance of analytics operations on structured data) and to perform one or more data disambiguation operations based on the structured data set 204, one or more prompt disambiguation operations based on the prompt 202, or both. To support these disambiguation operations, the disambiguation engine 210 may include an automated intent detection engine 212 that is configured to support prompt disambiguation functionality and an automated schema understanding engine 214 that is configured to support data disambiguation functionality. The automated intent detection engine 212 may be configured to map an incoming query, based on semantic embeddings, to a best optimized prompt stored in a prompt database. Such a mapping may result in the comparatively deterministic response to an input prompt based on historical data, thereby providing cleaner and more robust prompts for use by the agent orchestrator 218 and the ensemble model 220. For example, the automated intent detection engine 212 may extract one or more contextual features from the prompt 202 to generate an embedding that corresponds to the prompt 202, and the embedding may be matched to a closest embedding in a stored database of embeddings that correspond to the stored prompts. The stored prompt that is associated with the closest matching embedding may be used to modify or replace the prompt 202, thereby leveraging contextual embeddings as a powerful tool for understanding the intent of ambiguous prompts. As such, the automated intent detection engine 212 may receive the prompt 202 and the embeddings that correspond to the stored prompts as inputs, and the automated intent detection engine 212 may output a modified prompt 202 that is modified or replaced based on the stored prompt associated with the closest matching embedding.

The automated schema understanding engine 214 may be configured to modify the prompt 202 based on characteristics of the structured data set 204 and/or to select particular portions, such as particular rows or columns of particular data tables, of the structured data set 204 for analysis based on the prompt 202. In some implementations, the automated schema understanding engine 214 may ingest and pre-process the structured data set 204 by chunking groups of columns and/or rows from one or more data tables into smaller, semantically similar data tables, both vertically and/or horizontally. To enable the chunking, the automated schema understanding engine 214 may be configured to store the field names and respective descriptions of fields of the data table(s) of the structured data set 204 in a vector database and to group columns or rows of the data table(s) semantically (e.g., based on the respective fields and their descriptions). This may be part of an offline process. The automated schema understanding engine 214 may be configured to perform entity detection on the prompt 202, along with a filtered list of columns from the structured data set 204, to detect entities present in both the prompt 202 and the filtered list of columns. Such grouping and entity detection provides semantic understanding of the prompt 202 and the structured data set 204, i.e., the automated schema understanding engine 214 understands semantic categories/entities for questions (e.g., the prompt 202) and data (e.g., the structured data set 204). As an example, the automated schema understanding engine 214 may identify and recognize a time field from a sales total field. The horizontal chunking of rows in the data table(s) of the structured data set 204, may be understood based on regions, peers (domain knowledge), or the like. The vertical chunking of columns in the data tables of the structured data set 204 may indicate various subject domains, such as measurements, metrics, types of numerical results, and the like. The horizontal and vertical chunking may result in the creation of additional data tables with semantically similar fields, as further described with reference to FIG. 3. In some implementations, a highest common factor between columns may be removed to improve the semantic match between the prompt 202 and column names of the structured data set 204, as well as augmenting the column names with more text, synonyms, phrase expansion, column name edits, and generative AI-created descriptions Longest common subsequences may be removed, and a feedback mechanism provided to further improve performance of the automated schema understanding engine 214. These additional data tables may be used to replace portions of the prompt 202, such as words or phrases that correspond to field names. For example, "sales reps" may be replaced with "sales representatives" and "annual sales" may be replaced with "average yearly sales," based on information derived from the structured data set 204 by the automated schema understanding engine 214. After the data disambiguation operations are performed, the disambiguation engine 210 may perform prompt optimization operations to, at a high level, divide the prompt 202 into phrases and map the phrases to the various labels and embeddings in order to understand direct and indirect references to field names, aggregation or joins of multiple tables required to respond to the prompt 202, and mapping of intents from the prompt 202 to predetermined intents.

A non-limiting example of prompt and data disambiguation performed by the disambiguation engine 210 involves the prompt 202 "Calculate the attrition rate of business representatives in Austin over the last six months" for the structured data set 204 that includes fields in a first table for employee names, titles, start dates, and end dates, and a second table that includes employees, job titles, and locations. In this example, data disambiguation may be performed based on the structured data set 204 to understand the schema and automatically detect fields and their relationships, such as end date and start date in the first table, as well as the common field title between the first and second tables. Next, query disambiguation may be performed to understand, in the prompt 202, that "the last six months" is a duration of time from today's date to a date six months before today. Finally, in this example, prompt disambiguation may be performed to process the computations in order to aggregate the count of employees at the beginning and end of the duration to determine the attrition rate. As another example, the prompt 202 may include "Calculate the distribution of business representatives' tenure for each location and Lines of Business (LOB). Use a heat map." In this example, data disambiguation may be performed based on the structured data set 204 to understand the schema and automatically detect fields and their relationships, such as tenure of representatives, location, and LOB. Next, query disambiguation may be performed to understand the terms in the prompt 202, such as distribution of representatives. Finally, in this example, prompt disambiguation may be performed to process the computations in order to show the correlation between the tenure field to the location and LOB fields, which can be passed to a visualization agent to generate a heat map.

The prompt optimization engine 216 may be configured to receive the prompt 202, after modification by the disambiguation engine 210, and to perform one or more prompt optimization operations. The prompt optimization operations may be performed to utilize prompts and responses to optimize repeated similar prompts by adding a layer of caching to store prompt and response history, which improves scalability and parallel processing of the generative AI analytics engine 200. For example, the prompt optimization engine 216 may be configured to receive prompt 202 and replace the prompt 202 with a cached prompt if one of the cached prompts is sufficiently similar to the prompt 202. The similarity may be determined based on a comparison of embeddings (e.g., based on semantic similarity), based on NLP similarity, and the like, and using such similarity metrics as cosine similarity, as a non-limiting example. Because the cached prompts have already been determined to generate an accurate response within a reasonable timeframe, reusing the cached prompts may be faster and more efficient that using a new prompt that may take longer to perform the related analytics operations or that may take a significant period of time outputting incorrect answers and being adjusted based on user feedback. As such, functionality of the prompt optimization engine 216 may provide latency optimization for complex prompts, higher confidence for repeated prompts, and solutioning for generative AI model inconsistencies. Additionally, or alternatively, the prompt optimization engine 216 may provide prompt versioning to choose the most successful prompts and workflow based on question signals, such as simple questions regarding user feedback.

The agent orchestrator 218 is configured to select one or more "correct" generative AI agents to receive the prompt 202 for generating a response. These recommended generative AI agents may be selected from a pool of generative AI agents having agent architectures built and maintained on the analytics framework provided by the generative AI analytics engine 200, thereby enabling seamless communication and collaboration among the generative AI agents. The agent orchestrator 218 may select one or multiple generative AI agents based on the nature of the prompt 202 and the related use case, thus providing context-specific agent recommendations. Because the generative AI agents are selected based on their individual characteristics and functionality, the agent orchestrator 218 also supports a generic architecture to plug in any new generative AI agent with minimal overhead. By routing prompts and inputs to the most appropriate generative AI agent based on the context and expertise of each generative AI agent, the agent orchestrator 218 may ensure that the generative AI agents work in harmony, prevent conflicts or redundancies between generative AI agents, and monitor the performance and health of individual generative AI agents, including making adjustments or dynamic changing agent selection when necessary, to ensure high availability and reliability. In some implementations, the agent orchestrator 218 is configured to perform recursive agent assignment, such as via a process of sequentially and iteratively choosing multiple generative AI agents from a pool of generative AI agents based on a defined order. Additional details of agent orchestrator performance and agent selection are described further herein with reference to FIGS. 8-9.

The ensemble model 220 is an ensemble of the recommended generative AI agents from the agent orchestrator 218 and is configured to receive the prompt 202 and access the structured data set 204 to generate a response to the prompt 202. For example, the ensemble model 220 may include an ensemble of a CSV agent, a SQL agent, and a semantic search agent, as a non-limiting example. Other examples may include other combinations of the generative AI agents described above with reference to FIG. 1. The various individual agent outputs may be combined, weighted, and/or selected to provide a final ensemble model output that includes a response to the question indicated by the prompt 202. Such a response may include text data, numerical data, a natural language description and a numerical or statistical result, other information, or any combination thereof. In some implementations, the response may also be used as an input to generate one or more visual representations, as further described below. Additionally, the ensemble model 220 may be configured to generate and output a step-by-step breakdown of the logical process it takes in generating the response to the prompt 202, and this breakdown may be provided as a report to a user for their review. This reporting may create trust in the accuracy of the response by providing transparency to the user and by making the answering process more explainable.

In some implementations, the agent orchestrator 218 may perform recursive agent assignment to the ensemble model 220 using an explore and exploit approach. One problem with always recommending the highest scoring generative AI agents is that certain agents may get selected even though others score just as well, or certain agents may get selected based on historical performance that does not account for changes to performance based on current data, leading to potentially suboptimal results. Exploring with a greedy parameter P probability may avoid the ensemble model 220 getting stuck with suboptimal generative AI agents by introducing randomness, thereby enabling discovery of optimal generative AI agents despite sometimes limited data. To illustrate, generative AI agents' performance can change over time, resulting in performance degradation if the same set of agents are always selected. Exploration by the agent orchestrator 218 allows adaptation to changes, ensuring that the ensemble model 220 is not reliant on outdated information. This can be particularly problematic in SQL contexts, because in SQL databases, repeatedly querying for the same AI agent can lead to inefficient query responses. Because the agent orchestrator 218 is configured to exploit known agents, e.g., the highest ranked generative AI agents, $(1-\varepsilon)$ % of the time, the agent orchestrator 218 may optimize queries for known good agents while still introducing sufficient randomness to avoid suboptimal performance. In some implementations, a greedy algorithm parameter, designated F, may be set equal to 0.1, such that approximately 10% of the recommendations from the agent orchestrator 218 will be to explore random generative AI agents, while the remaining 90% of the recommendations will be for the generative AI agents currently determined to be the best based on past performance. Although described as randomly selecting agents, in some other implementations, the exploration phase may select agents that, although not being the highest-rated, still satisfy a lower threshold score or other criteria. Alternatively, the exploration phase may include randomly or pseudorandomly selecting agents from all available agents, without any constraints. The exploration and exploitation may be performed differently depending on the number of intents associated with the prompt 202 and the number of agents being selected by the agent orchestrator 218. For example, in the context of a single intent and a single agent, the agent orchestrator 218 may randomly select multiple generative AI agents for the intent during the exploration phase, and then select the generative AT agent with the highest mean score for the single intent during the exploitation phase. As another example, in the context of multiple intents and a single agent, the agent orchestrator 218 may randomly select multiple generative AT agents for each intent during the exploration phase, then select the generative AT agent with the highest mean score across all intents during the exploitation phase. As another example, in the context of multiple intents and multiple agents, the agent orchestrator 218 may randomly select multiple generative AT agents for each intent during the exploration phase, then select the highest scoring generative AT agent for each respective intent during the exploitation phase.

The adaptive visualization engine 222 is configured to receive the response generated by the ensemble model 220 and to generate one or more visual elements that visually represent at least a portion of the response. For example, the adaptive visualization engine 222 may be configured to generate line graphs, bar graphs, pie graphs, multi-dimensional graphs or charts, tables, other types of charts or graphs, other types of mathematical or statistical visualizations, or a combination thereof. In some implementations, the adaptive visualization engine 222 may include one or more generative AT agents that are trained to generate visual representations based on certain types of data, such as csv data, SQL data, Spark dataframes, Pandas dataframes, or the like.

The continuous learning engine 224 is configured to incorporate received feedback that is based on answers rated by subject matter experts (SMEs) or end users to add a layer of continuous adaptation and learning using a knowledge graph to certain repeated use cases. For example, the continuous learning engine 224 may maintain an intent taxonomy knowledge graph of intents and sub-intents related to user prompts and responses in order to facilitate adaptation to user feedback of responses output by the generative AI analytics engine 200. In such an example, a received user feedback that indicates a user's feedback and preferences related to a response may be used to update weights and relationships in the knowledge graph in real-time. Thus, the continuous learning engine 224 may ensure a deterministic approach to common use cases for a fairly non-deterministic system to provide repeatability for high confidence use cases.

Figure 3:
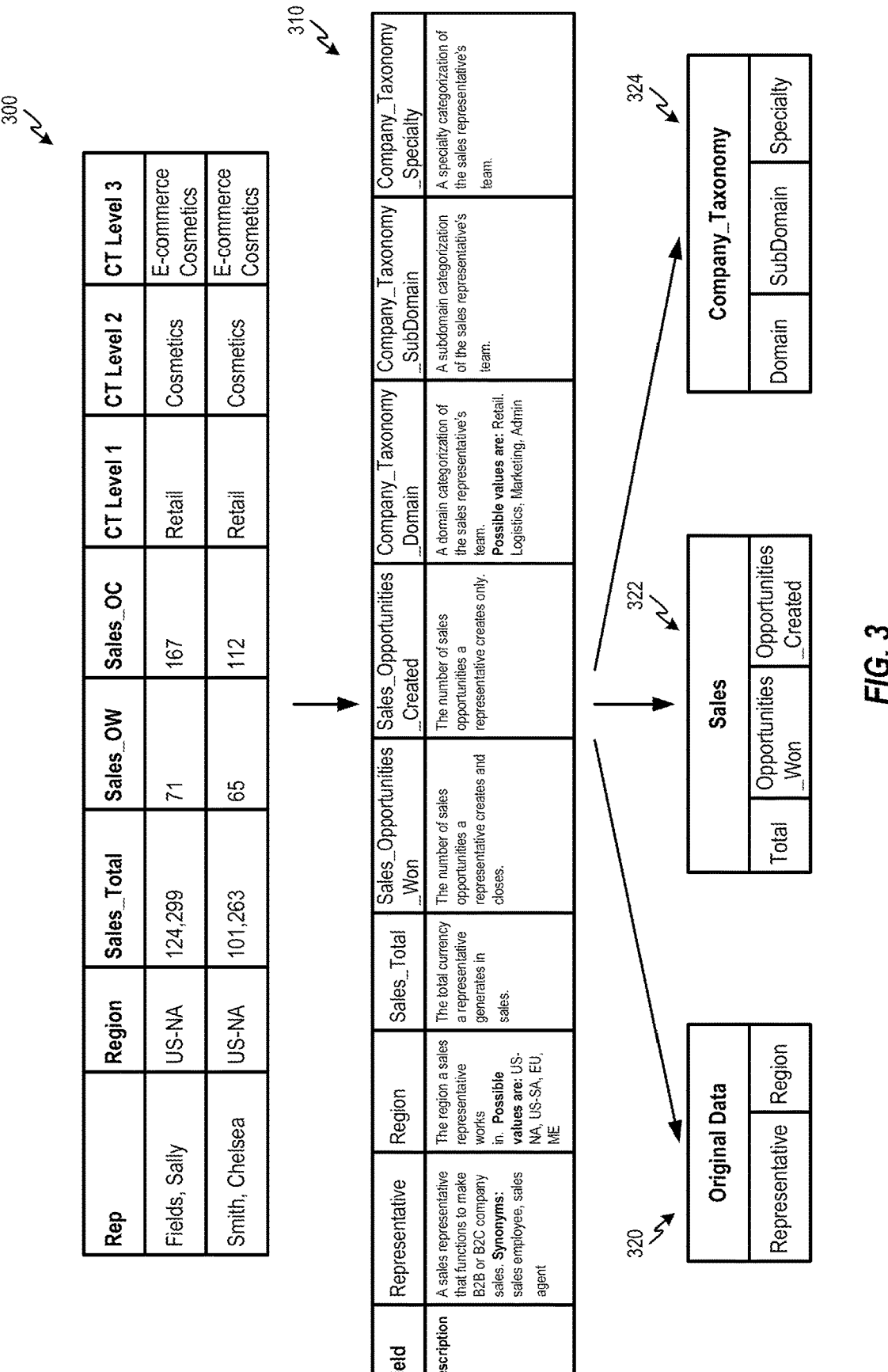
FIG. 3 illustrates an example of data disambiguation according to one or more aspects.

FIG. 3 illustrates an example of data disambiguation according to one or more aspects of the present disclosure. In some implementations, the data disambiguation described with reference to FIG. 3 may be performed by one or more devices of components of FIGS. 1-2, such as the computing device 102 of FIG. 1 or the disambiguation engine 210 of FIG. 2.

In the example shown in FIG. 3, a structured data set may include one or more data tables, such as an illustrative data table 300. The data table 300 includes multiple entries (shown as rows in the data table 300), each entry including corresponding values for multiple fields (shown as columns in the data table 300). In a particular example, the data table 300 is designed in accordance with a data schema that includes the following fields: representative ("Rep"), region ("Region"), sales_total ("Sales_Total"), sales_opportunities_won ("Sales_OW"), sales_opportunities_created ("Sales_OC"), company_taxonomy_domain ("CT Level 1"), company_taxonomy_subdomain ("CT Level 2"), and company_taxonomy_specialty ("CT Level 3"). The example shown in FIG. 3 includes two entries, for representatives Sally Fields and Chelsea Smith, each of which stores informational elements (e.g., values) for each of the fields of the data table 300. Although two entries and particular fields are shown in the example of FIG. 3, this example is for illustration, and other data tables described within the present disclosure may include a single entry or more than two entries, fewer than eight or more than eight fields, different fields than shown in FIG. 3, or a combination thereof.

To support data disambiguation, the data table 300 may undergo a schema description enhancement process in which the data schema, such as field names or related descriptions, are provided to a generative AI model, such as an LLM, to generate enhanced schema descriptions 310. In some implementations, the schema description enhancement may be performed by the automated schema understanding engine 214 of the disambiguation engine 210 of FIG. 2. To illustrate, an input prompt that includes a request to generate a description of a field name, and any additional description information (e.g., possible values, data types, relationships to other fields, synonyms of the field names, etc.), may be provided to the generative AI model to generate each of the enhanced schema descriptions 310. The enhanced schema descriptions 310 may include a plain language description of each of the field names of the data table 300 that are more descriptive than the field names themselves. For example, the description of the representative field may be "A sales representative that functions to make B2B or B2C company sales. Synonyms: sales employee, sales agent." The description of the region field may be "The region a sales representative works in. Possible values are: US-NA, US-SA, EU, ME." The description of the sales_total field may be "The total currency a representative generates in sales." The description of the sales_opportunities_won field may be "The number of sales opportunities a representative creates and closes." The description of the sales_opportunities_created field may be "The number of sales opportunities a representative creates only." The description of the company_taxonomy_domain field may be "A domain categorization of the sales representative's team. Possible values are: Retail, Logistics, Marketing, Admin." The description of the company_taxonomy_subdomain field may be "A subdomain categorization of the sales representative's team." The description of the company_taxonomy_specialty field may be "A specialty categorization of the sales representative's team." As illustrated by these examples, the enhanced schema descriptions 310 provide additional description of the data schema of the data table 300, such as descriptions of field names, synonyms, permissible values or types, and the like, which enable semantic-based grouping and slicing of the data table 300.

After the enhanced schema descriptions 310 are generated, the descriptions may be used to semantically group portions of the data table 300 to create new data tables based on a grouping algorithm and data slicing. In the example shown in FIG. 3, grouping fields (e.g., columns) of the data table based on semantic similarity and slicing the groups into separate tables results in the creation of three new data tables, an original data table 320, a sales data table 322, and a company taxonomy data table 324. To illustrate, a semantic analysis of the enhanced schema descriptions 310 may determine that the sales total field, the sales_opportunities_won field, and the sales_opportunities_created field are all related to sales, either in value or in numbers of opportunities, and thus these three fields may be grouped together to form the sales data table 322. Additionally, the semantic analysis of the enhanced schema descriptions 310 may determine that the company_taxonomy_domain field, the company_taxonomy_subdomain field, and the company_taxonomy_specialty field are all related to descriptions in the context of a company taxonomy, particularly various categorizations of a sales representative's team according to the company taxonomy, and thus these three fields may be grouped together to form the company taxonomy data table 324. Similarly, the semantic analysis of the enhanced schema descriptions 310 may determine that the representative field and the region field both contain information about sales representatives, such as their name and location, but not about their sales or with respect to the company taxonomy, and thus these two fields may be grouped together to form the original data table 320.

These new data tables may be used to respond to a user question represented by a prompt in a faster and more efficient manner than just the data table 300. For example, if the prompt includes "How many sales agents have closed more than 70,000 sales in the company retail domain?", a generative AI agent may have difficulty responding to the question due to issues such as the use of the synonym "sales agents," ambiguity regarding whether the amount of sales refers to total sales or sales opportunities, and ambiguity regarding the phrase "company retail domain." However, if a generative AI agent has access to the enhanced schema descriptions 310 and the new data tables 320-324, the generative AI agent may identify "sales agent" as a synonym for "sales representative" in the original data table 320. The generative AI agent may also determine that "closed more than 70,000 sales" relates to the sales_opportunities_won field in the sales data table 322 based on a comparison of the prompt to the description of the sales_opportunities_won field. The generative AI agent may also determine that "in the company retail domain" is requesting that the company_taxonomy_domain field in the company taxonomy data table 324 have the value of "Retail." As such, a correct response may be determined by counting the number of entries for which the sales_opportunities_won field is greater than 70,000 and the company_taxonomy_domain field is "Retail".

Figure 4:
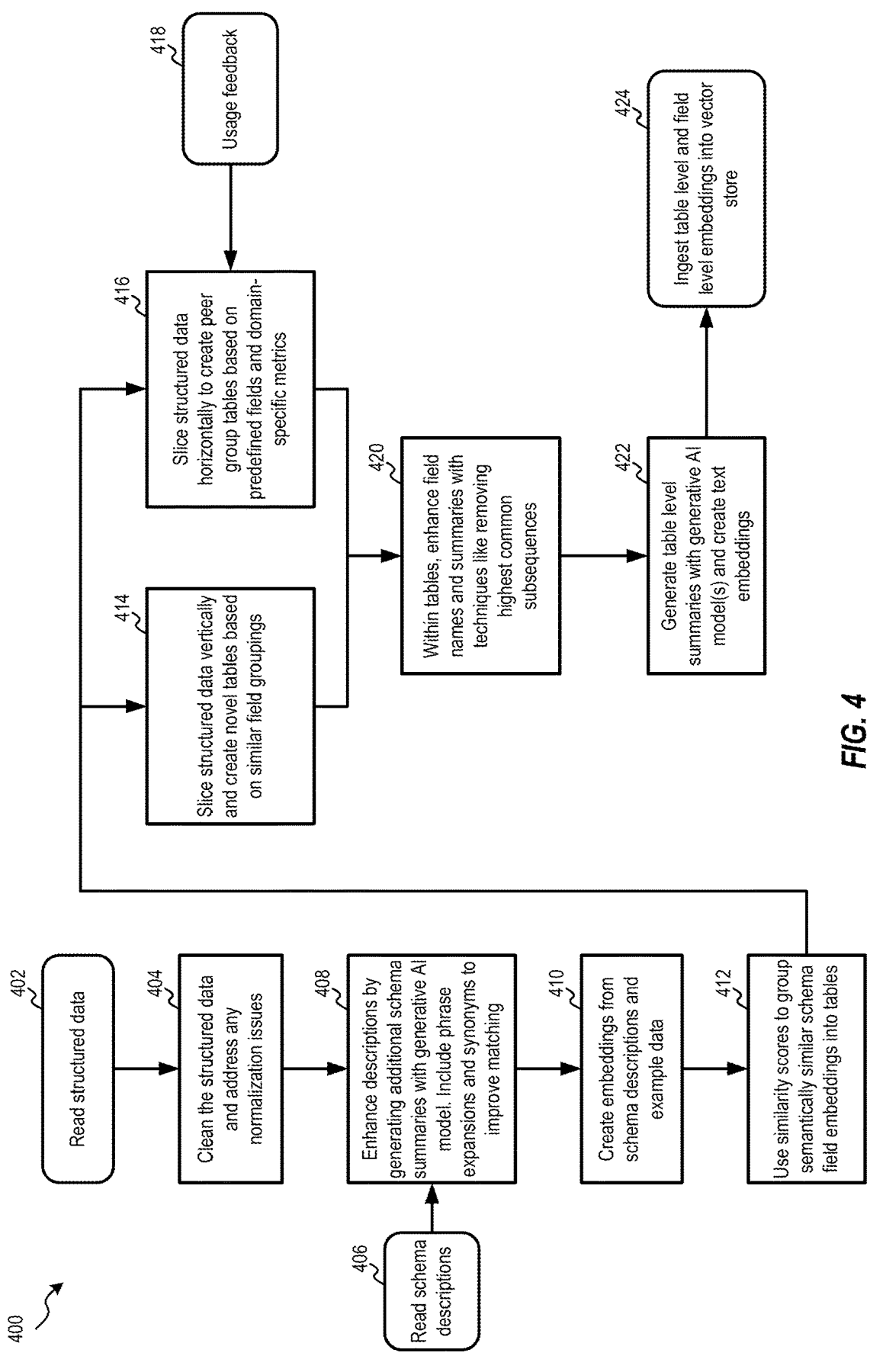
FIG. 4 is a flow diagram illustrating an example process flow for generating embeddings for use in data disambiguation according to one or more aspects.

Referring to FIG. 4, an example of a process flow diagram for generating embeddings for use in data disambiguation according to one or more aspects of the present disclosure is shown as a process flow 400. In some implementations, operations described with reference to the process flow 400 may be performed by one or more components of the system 100 of FIG. 1 or the generative AI analytics engine 200 of FIG. 2, such as one or more of the computing device 102 or the user device 150 of FIG. 1 or the disambiguation engine 210 of FIG. 2.

The process flow 400 begins at 402 and includes reading structured data, at 402. For example, In some implementations, the structured data may include CSV data, SQL data, or other types of structured data that includes at least some numeric data. The process flow 400 includes cleaning the structured data and addressing any normalization issues, at 404. For example, duplicate or redundant values may be deleted, partial or missing values may be deleted or extrapolated, at least some values may be normalized or formatted to a common format, or the like.

The process flow 400 includes reading schema descriptions, at 406, and enhancing the schema descriptions by generating additional schema summaries with a generative AI model (e.g., an LLM), at 408. For example, the additional schema summaries may include or correspond to the enhanced schema descriptions 310 of FIG. 3 and may be generated by using field names or other information associated with the schema descriptions as input prompts to the generative AI model to generate more detailed descriptions. Such enhancing of the schema descriptions may include phrase expansions and generating synonyms to improve matching, identifying acceptable or prohibited values, or the like. The process flow 400 includes creating embeddings from the schema descriptions and example data, at 410. For example, one or more semantic features may be extracted from the schema descriptions, the enhanced schema descriptions, and the example structured data to generate embeddings that represent the structured data, such as embeddings for each of the fields, as a non-limiting example. The process flow 400 includes using similarity scores to group semantically similar schema field embeddings into tables, at 412.

For example, field embeddings that are sufficiently semantically similar (e.g., based on similarity scores between the embeddings) may be grouped together, such as the fields related to sales that resulted in the sales data table 322 of FIG. 3. In some implementations, the similarity scores include cosine similarity scores.

The process flow 400 progresses from 412 to 414 and 416. The process flow 400 includes slicing the structured data vertically and creating novel tables based on similar field groupings, at 414. For example, fields that are grouped together based on semantic similarity may be vertically sliced to generate new data tables, such as the original data table 320, the sales data table 322, and the company taxonomy data table 324 of FIG. 3. The process flow 400 includes slicing the structured data horizontally to create peer group tables based on predefined fields and domain-specific metrics, at 416. For example, a data table that includes a region field may be horizontally sliced to create new data tables with entries that correspond to a respective one of the possible regions. Horizontal slicing may be performed based on rows in the data tables for reducing latency. To illustrate, in the example described with reference to FIG. 3, a first new data table may include entries associated with the US-NA region, a second new data table may include entries associated with the US-SA region, a third new data table may include entries associated with the EU region, and a fourth new data table may include entries associated with the ME region. The slicing described with reference to 416 may be performed based on usage feedback received at 418. For example, user feedback may indicate a particular field for which horizontal slicing is to be performed, or particular values to be sliced into different data tables. Other examples of data slicing (e.g., vertical slicing, horizontal slicing, or both) include slicing company data based on company policies (creating tables for each geographical region of a company and controlling access based on location), slicing by location fields and subfields (state income tax rate data sliced into tables by state, or based on location-specific types (e.g., flat tax or progressive tax)), based on legal topics (legal data sliced based on legal topics and then by location (e.g., state)), or the like.

After the structured data is horizontally and vertically sliced, process flow 400 continues to 420, and, within the tables, field names and summaries are enhanced with techniques like removing common subsequences. For example, the field names and summaries associated with the new data tables may be used to generate prompts for the generative AI model to cause generation of schema descriptions of the new data tables. Such descriptions may be processed by removing common descriptions (e.g., subsequences) between the originally generated data tables and associated descriptions and the new data tables and the associated descriptions, resulting in descriptions of the new data tables that are different and thus more useful for identification purposes. The process flow 400 includes generating table level summaries with generative AI model(s) and creating text embeddings, at 422. For example, the field descriptions of fields included in the data tables may be used to generate prompts to cause the generative AI model to output summaries or descriptions of the various data tables, such as a description of the sales data table 322 of FIG. 3 that includes "This table includes sales results for each representative, including total sales values, created sales opportunities, and won sales opportunities." In some implementations, the generative AI model includes one or more LLMs. The process flow 400 concludes at 424, and table level and field level embeddings are ingested into a vector store. For example, the table level embeddings and the field level embeddings may be stored in a database of embeddings, where each field level embedding is linked to table level embeddings that correspond to data tables that include the field represented by the respective field level embedding.

Referring to FIG. 5, an example of a process flow diagram for performing data disambiguation according to one or more aspects of the present disclosure is shown as a process flow 500. In some implementations, operations described with reference to the process flow 500 may be performed by one or more components of the system 100 of FIG. 1 or the generative AI analytics engine 200 of FIG. 2, such as one or more of the computing device 102 or the user device 150 of FIG. 1 or the disambiguation engine 210 of FIG. 2.

The process flow 500 begins at 502 and includes reading a user prompt. For example, the prompt may represent a question asked by a user, and the question may require mathematical or statistical analysis of structured data to respond. The process flow 500 includes creating embeddings of the user prompt, at 504. For example, one or more semantic features may be extracted from the prompt to generate an embedding that represents the prompt, similar as to described above with respect to generating embeddings of field descriptions with respect to FIG. 4. The process flow 500 includes performing a semantic search to find and rank the top n table descriptions based on a custom ranking algorithm. For example, a semantic search may be performed to find the n table descriptions from a database of table embeddings that are most similar to the embedding generated based on the prompt. The number of most similar embeddings, n, may be any integer that is greater than or equal to one (e.g., a single highest ranked embedding may be identified or multiple highest ranked embeddings may be identified).

The process flow 500 includes determining whether a score associated with the top n tables is greater than a threshold, at 508. For example, one or more similarity scores that represent the semantic similarity between the prompt embedding and the highest ranked embeddings may be compared to a threshold to determine if the score(s) satisfy the threshold. As used herein, satisfying a threshold may refer to being greater than a threshold, or being greater than or equal to a threshold, unless otherwise specified. The score may be an average of the similarity scores, a highest similarity score, a lowest of the similarity scores, a sum of the similarity scores, a weighted average of the similarity scores, or another score, and the similarity score may be a cosine similarity or another similarity metric. The threshold may be a learned threshold that is based on domain specific information, feedback, clustering, or a combination thereof. If the score is not greater than (e.g., does not satisfy) the threshold, the process flow 500 proceeds to 518, and fields and tables are selected using additional signals. The additional signals may include or correspond to follow-up questions provided to the user, data usage or other measurements associated with the structured data set, other information, or a combination thereof. For example, if the score fails to satisfy the threshold, a question may be provided to the user that requests additional names or phrasing of a portion of the prompt, a more detailed prompt, a particular formula or expression, or the like. The process flow 500 terminates at 518, with the additional results being treated as a new prompt, at 502.

Returning to 508, if the score is greater than or equal to the threshold (e.g., satisfies the threshold), the process flow 500 continues to 510, and a semantic search is performed to find and rank the top m fields within the top n tables based on a custom ranking algorithm. For example, a semantic search may be performed to find the m field descriptions, which are associated with the n tables, from a database of field embeddings that are most similar to the embedding generated based on the prompt. The number of most similar field embeddings, m, may be any integer that is greater than or equal to one (e.g., a single highest ranked embedding may be identified or multiple highest ranked embeddings may be identified). In some implementations, m and n are the same number. In other implementations, m and n are different numbers (e.g., m may be less than n or n may be less than m). The process flow 500 includes determining whether a score associated with the top m fields is greater than a threshold, at 512. For example, one or more similarity scores that represent the semantic similarity between the prompt embedding and the highest ranked field embeddings may be compared to a threshold to determine if the score(s) satisfy the threshold. The score may be an average of the similarity scores, a highest similarity score, a lowest of the similarity scores, a sum of the similarity scores, a weighted average of the similarity scores, or another score, and the similarity score may be a cosine similarity or another similarity metric. The threshold may be a learned threshold that is based on domain specific information, feedback, clustering, or a combination thereof. If the score is not greater than (e.g., does not satisfy) the threshold, the process flow 500 proceeds to 518, and fields and tables are selected using additional signals, as described above. The process flow 500 terminates at 518.

Returning to 512, if the score is greater than or equal to (e.g., satisfies) the threshold, the process flow 500 continues to 514, and an agent prompt is generated using the selected fields (e.g., the top m fields). For example, the original user prompt may be modified to replace particular portions with one or more of the identified fields or to otherwise modify the original prompt to be more similar to the identified fields. The process flow 500 concludes at 516, and an agent orchestrator is run using the user prompt and the selected tables, at 516. For example, the agent orchestrator may select one or more generative AI agents to receive the modified prompt as input to perform analytics functionality on the identified data tables from the structured data set.

Figure 6:
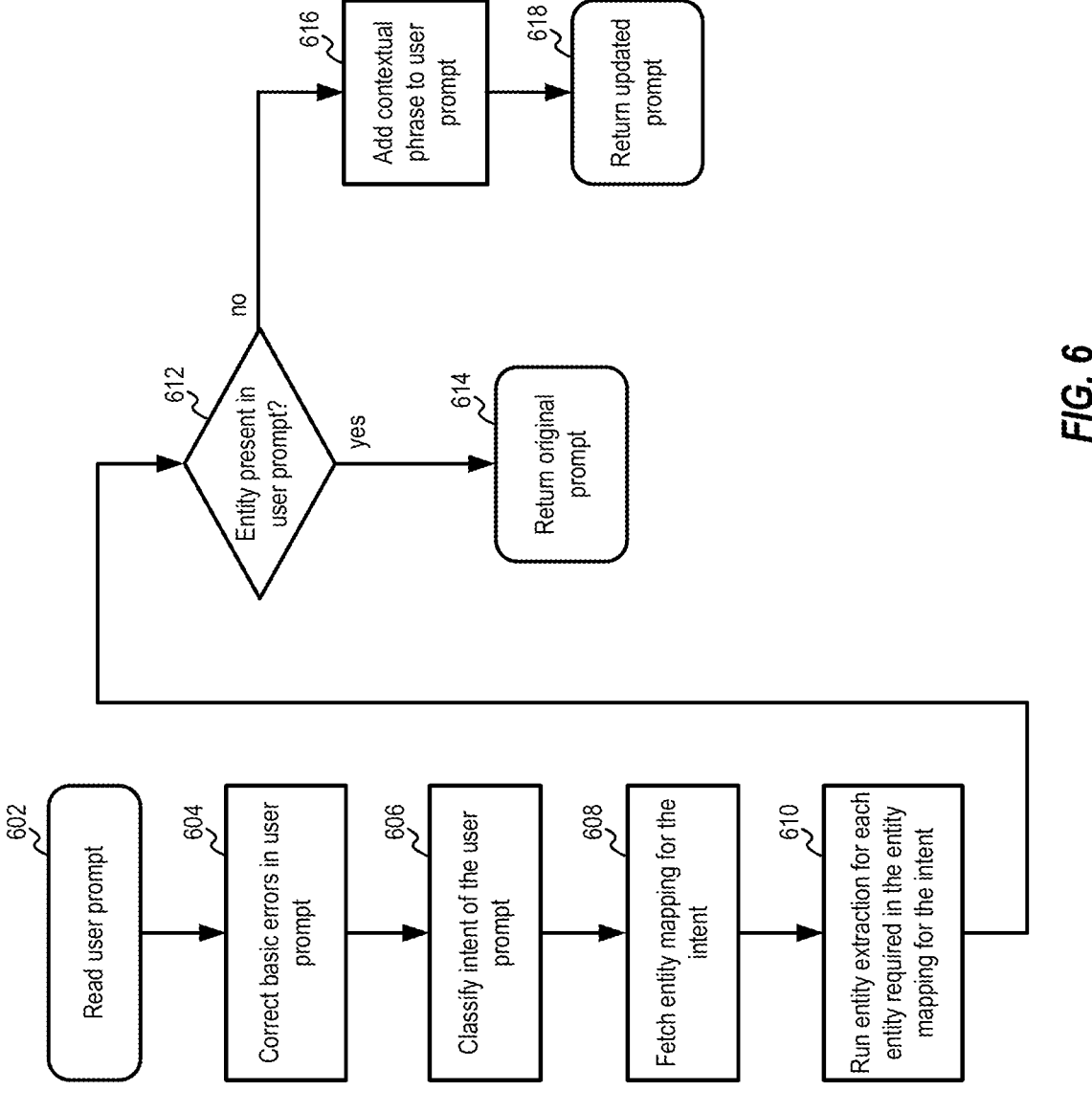
FIG. 6 is a flow diagram illustrating an example process flow for performing prompt disambiguation according to one or more aspects.

Referring to FIG. 6, an example of a process flow diagram for performing prompt disambiguation according to one or more aspects of the present disclosure is shown as a process flow 600. In some implementations, operations described with reference to the process flow 600 may be performed by one or more components of the system 100 of FIG. 1 or the generative AI analytics engine 200 of FIG. 2, such as one or more of the computing device 102 or the user device 150 of FIG. 1 or the disambiguation engine 210 of FIG. 2.

The process flow 600 begins at 602 and includes reading a user prompt. For example, the prompt may represent a question asked by a user, and the question may require mathematical or statistical analysis of structured data to respond. The process flow 600 includes correcting basic errors in the user prompt, at 604. For example, spellcheck and grammar check may be run on the user prompt, missing punctuation may be added to the user prompt, or the like. The process flow 600 includes classifying an intent of the user prompt, at 606. For example, the automated intent detection engine 212 of FIG. 2 may process the user prompt and determine an intent of the user prompt, such as by extracting one or more contextual features to generate a semantic embedding and comparing the semantic embedding to known intent embeddings to determine a most similar intent from a database of intent embeddings. Additionally or alternatively, the intent may be identified by providing the prompt to a trained ML or AI model that is trained to classify intent based on prompts (or embedding vectors).

The process flow 600 includes fetching an entity mapping for the intent, at 608. For example, a database may include mappings of intents to corresponding entity lists associated with the respective intents (e.g., entities that are present in prompts that have the intent), and an entity list that corresponds to the determined intent may be fetched. The process flow 600 includes running an entity extraction for each entity required in the entity mapping for the intent, at 610. For example, for each entity in the entity list, the user prompt may be analyzed to extract a value of the respective entity from the prompt. As an illustrative example, if the intent is identified as determining a count of particular employee type in a particular region, the prompt may be analyzed to extract the particular employee type and the particular region based on the corresponding entity list including employee type and region.

The process flow 600 includes, for each entity, determining whether the entity is present in the user prompt, at 612. For example, if a value can be determined for each of the entities within the prompt, each of the entities is present. Alternatively, if some entities can be detected, but at least one is not, than at least one entity is not present. If each of the entities are present in the user prompt, the process flow 600 concludes at 614, and the original user prompt is returned. Because the original user prompt contains all the known entities associated with the determined intent, the original user prompt may be used without modification by an agent orchestrator and selected generative AI agents. If at least one of the entities are not present in the user prompt, the process flow 600 proceeds from 612 to 616, and a contextual phrase is added to the user prompt to update the user prompt. For example, if at least one of the entities is not present, the prompt may have a decreased likelihood of resulting in an accurate response from the generative AI agents, so a contextual phrase may be added to improve the accuracy of the response provided based on the modified prompt. As a non-limiting example, if the prompt includes "Return the last three sales representatives that closed more than 1,000 opportunities", the prompt may be identified as having an intent of determining a particular number of sales representatives based on closed sales opportunities. In such an example, an entity list associated with this intent may include representative type and closed sales opportunity metric, and performing entity extraction may result in an entity (e.g., greater than 1000) for the closed sales opportunity metric, but no entity for the representative type entity, as "the last three" is too ambiguous to be detected as the entity. In this example, prompt may be modified to replace "the last three sales representatives" with "the three most recent sales representatives from today's date", which provides additional context for the generative AI agents and is more likely to result in an accurate response. The process flow 600 concludes at 618, and the updated user prompt is returned, for use by the agent orchestrator and the generative AI agents.

Figure 7:
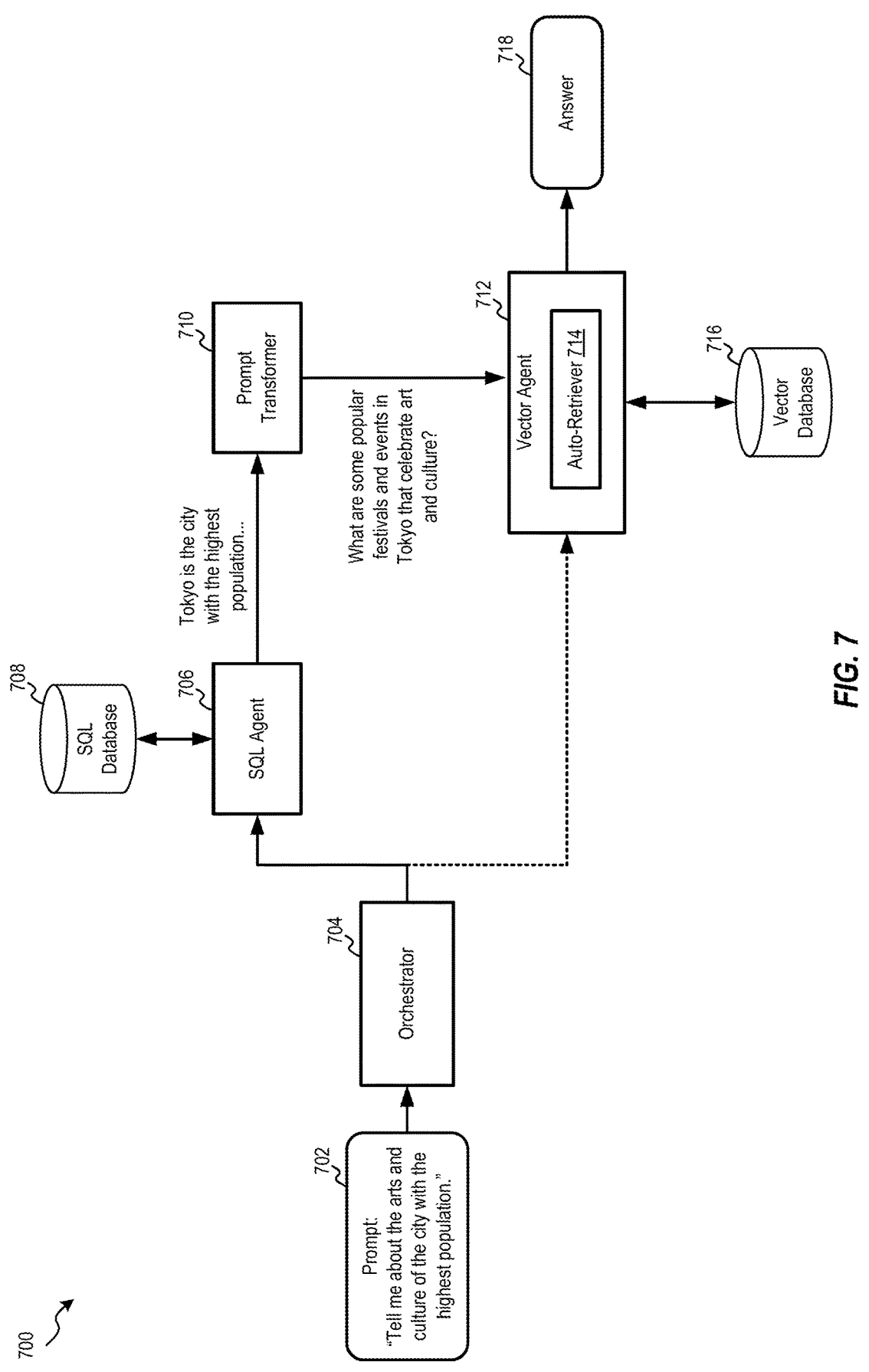
FIG. 7 is a block diagram of an example of agent orchestration for a complex query according to one or more aspects.

Referring to FIG. 7, an example of agent orchestration for a complex query according to one or more aspects of the present disclosure is shown as an agent orchestrator system 700. In some implementations, the agent orchestrator system 700 may be included in or integrated in the computing device 102 of FIG. 1 or the generative AI analytics engine 200 of FIG. 2, or one or more components of the agent orchestrator system 700 may include or correspond to one or more components of the computing device 102 of FIG. 1 or the generative AI analytics engine 200 of FIG. 2. The agent orchestrator system 700 may be configured to receive a prompt 702 and to generate an answer 718 based on the prompt 702. As shown in FIG. 7, the agent orchestrator system 700 includes an orchestrator 704, an SQL agent 706, a prompt transformer 710, and a vector agent 712. Although illustrated as separate components, in other implementations, one or more of the components 704, 706, 710, and 712 may be combined or their operations may be performed by one or more devices of the system 100 of FIG. 1.

The orchestrator 704 (e.g., an agent orchestrator) is configured to determine which agents to assign a task based on the prompt 702. For example, the orchestrator 704 may extract features from the prompt 702, as well as extract features from a structured data set from which the prompt 702 is to be answered and generate features based on the agents available for selection, and these features may be compared and used to select one or more agents to perform tasks to answer the prompt 702, as further described herein with reference to FIG. 8. The agents may also be selected based on a task requested in the prompt 702. For example, if the prompt 702 requests display of the answer via a bar graph, the orchestrator 704 may select, as one of the agents, a visualization agent that is capable of generating a bar graph as an output. The orchestrator 704 may be configured to select a single agent to perform a task, multiple agents to perform tasks concurrently, or a sequence of agents to perform sequential tasks, in order to generate the answer 718. In the example shown in FIG. 7, the orchestrator 704 determines to answer the prompt 702 using a sequence of the SQL agent 706 followed by the vector agent 712. Upon this determination, the orchestrator 704 provides the prompt 702 to the SQL agent 706 and configures the vector agent 712 to receive a response from the SQL agent 706 (via the prompt transformer 710). The SQL agent 706 receives the prompt 702 and queries an SQL database 708 to generate a response. For example, the SQL agent 706 may perform a text-to-SQL query over the SQL database 708 based on the prompt 702. In the example shown in FIG. 7, the prompt is "Tell me about the arts and culture of the city with the highest population", the SQL agent 706 generates a query "What is the largest city in Japan", and the response retrieved from the SQL database 708 is "Tokyo is the city with the highest population . . . ".

The response generated by the SQL agent 706 and the prompt 702 may be provided to the prompt transformer 710, which generate a prompt for the vector agent 712 based on the inputs. For example, the prompt transformer 710 may replace some of the prompt 702 with some of the response generated by the SQL agent 706 to generate the prompt for the vector agent 712, optionally with some additional modification to improve the prompt. In the example shown in FIG. 7, the prompt transformer 710 converts the response from the SQL database 708 and the prompt 702 to an input prompt "What are some popular festivals and events in Tokyo that celebrate art and culture?" for the vector agent 712. The prompt transformer 710 provides the generated prompt to the vector agent 712, and the vector agent 712 to retrieves a vector from a vector database 716 based on the input prompt. In some implementations, the vector agent 712 includes an auto-retriever 714 that is configured to automatically adjust the received prompt as needed, such as by reformatting or the like, and automatically perform a query of the vector database 716 to retrieve a vector response based on the received prompt. The vector agent 712 may generate a response based on the retrieved vector, and the response may be output as the answer 718. In this manner, the answer 718 may be generated by a sequence of execution of multiple agents (e.g., the SQL agent 706 and the vector agent 712) that are selected by the orchestrator 704.

Figure 8:
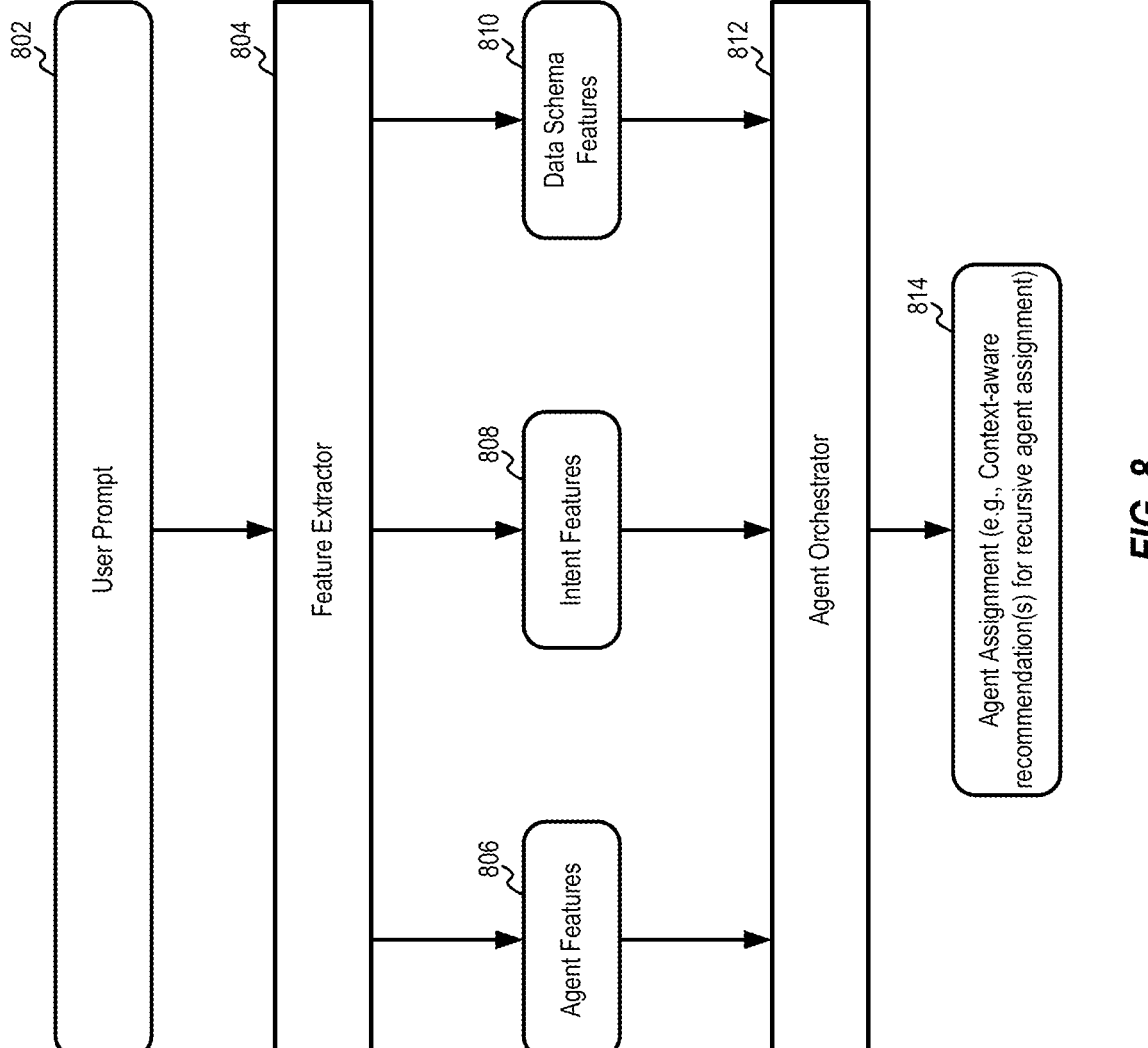
FIG. 8 is a block diagram of an example of feature extraction and generative AI agent selection according to one or more aspects.

FIG. 8 illustrates an example 800 of an example of feature extraction and generative AI agent selection according to one or more aspects of the present disclosure. In some implementations, components described with reference to the example 800 may be included in or integrated in the computing device 102 of FIG. 1 or the generative AI analytics engine 200 of FIG. 2, or one or more components described with reference to the example 800 may include or correspond to one or more components of the computing device 102 of FIG. 1 or the generative AI analytics engine 200 of FIG. 2. In the example 800 shown in FIG. 8, a user prompt 802 is provided to a feature extractor 804 to extract features from the user prompt 802, and the extracted features are provided to an agent orchestrator 812 to generate an agent assignment 814 based on the extracted features. Such operations enable generation of one or more context-aware recommendations for generative AI agent assignment to the performance of tasks associated with generating a response to the user prompt 802.

To enable the feature extraction and generative AI agent selection functionality associated with the example 800, the feature extractor 804 may be configured to extract multiple types of features from the user prompt 802 and a structured data set that is to be analyzed to generate a response to the user prompt 802. The multiple types of features may include agent features 806 associated with the generative AI agents to be selected, intent features 808 associated with an intent of the user prompt 802, and data schema features 810 associated with schema(s) of the structured data set. The agent features 806 may include features such as expertise level of the respective generative AI agent, historical performance metrics of the respective generative AI agent, response time associated with the respective generative AI agent, other metrics or information indicative of generative AI capabilities or performance, or a combination thereof. The intent features 808 may include features such as intent type associated with the intent determined from the user prompt 802, intent complexity associated with the intent determined from the user prompt 802, other characteristics of the intent, or a combination thereof. The data schema features 810 may include features such as data complexity associated with the structured data set, data types included in the structured data set, data size of the structured data set, other characteristics of the structured data itself and/or the schema used to organize the structured data set, or a combination thereof.

The agent orchestrator 812 is configured to output an agent assignment 814 that indicates a selection of one or more generative AI agents based on the agent features 806, the intent features 808, and the data schema features 810. To illustrate, each of the available generative AI agents may be associated with various performance metrics, success rates or other rankings related to particular data schema features, and success rates or other rankings related to particular intent features, and the agent orchestrator 812 may be configured to determine overall scores or rankings for each of the generative AI agents and to select one or more generative AI agents that are determined to be the "best" to process the user prompt 802 based on the features 806-810. In some implementations, the agent orchestrator 812 may determine an overall score for each generative AI agent, and the agent orchestrator 812 may select any of the generative AI agents that have a score that satisfies a threshold for indication in the agent assignment 814. Additionally or alternatively, the agent orchestrator 812 may select a particular number of highest scoring generative AI agents, or a highest scoring generative AI agent and any other generative AI agents within a threshold score range of the highest scoring agent. Alternatively, instead of selecting a single agent or multiple agents to perform tasks in parallel, the agent orchestrator 812 may select multiple agents to perform tasks in sequence, such as a first agent to generate a numerical result and a second agent to generate a visual output of the numerical result, as a non-limiting example. In some implementations, the agent orchestrator 812 includes or corresponds to a trained AI or ML classifier that is trained to select generative AI agents based on input features. For example, the agent orchestrator 812 may be trained based on labeled input features that are labeled according to selected generative AI agents using a supervised learning process, or the agent orchestrator 812 may be trained to cluster features and select generative AI agents based on clusters using an unsupervised learning process. Additionally or alternatively, the agent orchestrator 812 may include or correspond to a generative AI model, such as an LLM, that is configured to receive a prompt that describes the features 806-810 and that a request to select the best generative AI agent(s) from a pool of available generative AI agents.

As an illustrative example of agent selection, the user prompt 802 may include "What is the average monthly occupancy for representatives in Chicago in the past three months?" In this example, the intent features 808 include intent type—statistical and intent complexity—high, and the data schema features 810 may include data complexity— high, data type—categorical, integer, and data volume— large. In this example, the agent features 806 include expertise level—SQL Agent, Spark Agent, Spark SQL agent (e.g., these three agents are associated with expertise levels that satisfy requirements associated with the intent features 808 and the data schema features 810), historical performance metrics (of the respective agents)—0.80, 0.82, 0.85, and response time (of the respective agents)—1 second, 0.8 seconds, 0.5 seconds. Based on these features, the agent assignment 814 for this example includes the Spark SQL Agent, which had the highest historical performance metric and the lowest response time of the three generative AI agents associated with the expertise level.

As another example, the user prompt 802 may include "What is the average monthly occupancy for representatives in Austin in the past three months? Generate a pie chart for the ratio of representatives in each location." In this example, the intent features 808 include intent type—statistical, visualization, and intent complexity—high, and the data schema features 810 may include data complexity— high, data type—categorical, integer, and data volume— large. In this example, the agent features 806 include expertise level—SQL Agent, Spark Agent, Spark SQL agent, Pandas agent, Visualization agent (e.g., these five agents are associated with expertise levels that satisfy requirements associated with the intent features 808 and the data schema features 810), historical performance metrics (of the respective agents)—0.80, 0.82, 0.85, 0.84, 0.86, and response time (of the respective agents)—1 second, 0.8 seconds, 0.5 seconds, 0.9 seconds, 0.5 seconds. Based on these features, the agent assignment 814 for this example 1. Spark SQL Agent, 2. Pandas agent, and 3. Visualization agent.

Figure 9:
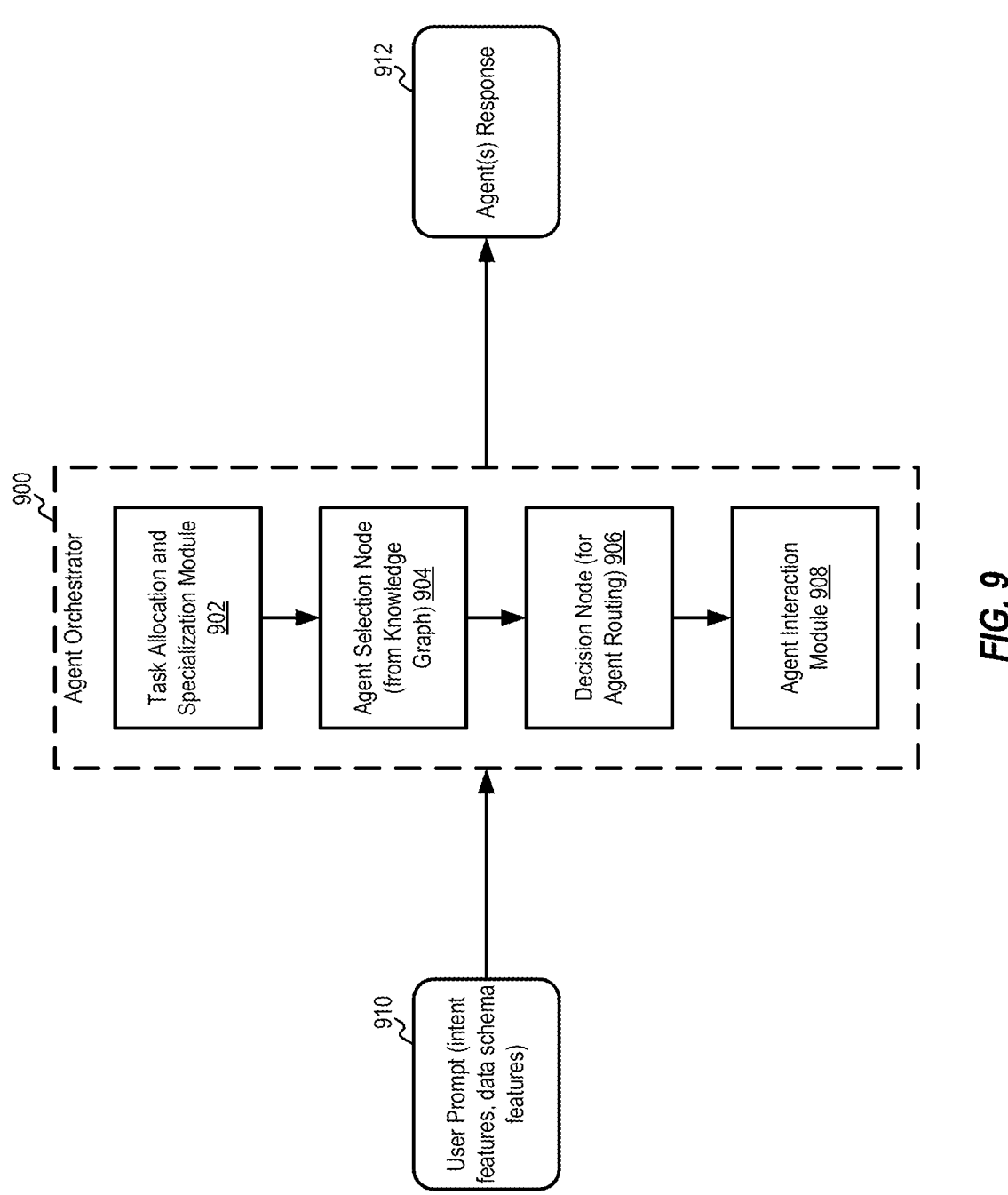
FIG. 9 is a block diagram of an example of an agent orchestrator according to one or more aspects.

FIG. 9 illustrates an example of an agent orchestrator 900 according to one or more aspects of the present disclosure. In some implementations, the agent orchestrator 900 may include or correspond to the agent orchestrator 124 of FIG. 1, the agent orchestrator 218 of FIG. 2, the orchestrator 704 of FIG. 7, or the agent orchestrator 812 of FIG. 8. The agent orchestrator 900 is configured to receive a user prompt and features 910, including intent features and data schema features, and to select one or more generative AI agents to perform tasks based on the user prompt and features 910 to generate the agent(s) response 912. As such, this example of an agent orchestrator is configured to select the generative AI agents and to interact with the selected agents to facilitate generation of the agent(s) response 912, as compared to the example of FIG. 8 that outputs a recommendation of selected agents but does not interact with the agents to cause generation of the response.

As shown in FIG. 9, the agent orchestrator 900 includes a task allocation and specialization module 902, an agent selection node 904, a decision node 906, and an agent interaction module 908. The task allocation and specialization module 902 is configured to assign specific tasks or domains to the appropriate generative AI agents based on the user prompt and features 910, such as by deciding (e.g., selecting) which generative AI agent(s) to invoke to handle the user prompt and features 910. The agent selection node 904 is configured to select the most suitable generative AI agent(s) for the assigned task (e.g., the tasks assigned by the task allocation and specialization module 902). The agent selection node 904 may select generative AI agent(s) based on agent capabilities, agent expertise, and context of the user prompt and features 910 and a structured data set to be accessed to perform the tasks. In some implementations, the agent selection node 904 may use a knowledge graph, such as an intent taxonomy knowledge graph, in the agent selection process. Additionally or alternatively, the agents selected by the agent selection node 904 may be a single agent, multiple agents to perform the task in parallel, or a sequence of multiple agents to each perform portions of the overall task. This determination is dynamic and is based on the prompt provided by the user, as well as based on factors associated with the agents themselves, such as whether a prompt requires a visualization (and if so, which agents are capable of outputting visualizations), the size of the data set and the performance of various agents for similar sized data sets (e.g., if a metric associated with an agent for a particular data set size satisfies a threshold, than it is selected), other factors, or a combination thereof. In some implementations, the metrics, thresholds, or weightings that go into the determinations performed by the agent selection node 904 (e.g., the agent orchestrator 900) are learned based on feedback and historical data. The decision node 906 is configured to route the user prompt and features 910 to the selected generative AI agent(s) responsible for handling the task. For example, the decision node 906 may route the user prompt and features 910 to a single agent if a single agent is selected, to multiple agents if multiple agents are selected to perform tasks in parallel (e.g., concurrently), or to the first one or more agents of multiple agents if multiple agents are selected to perform tasks in a sequence. The agent interaction module 908 is configured to facilitate processing of the user prompt and features 910 by the selected generative AI agent(s) and to output the generated responses as the agent (s) response 912.

Figure 10:
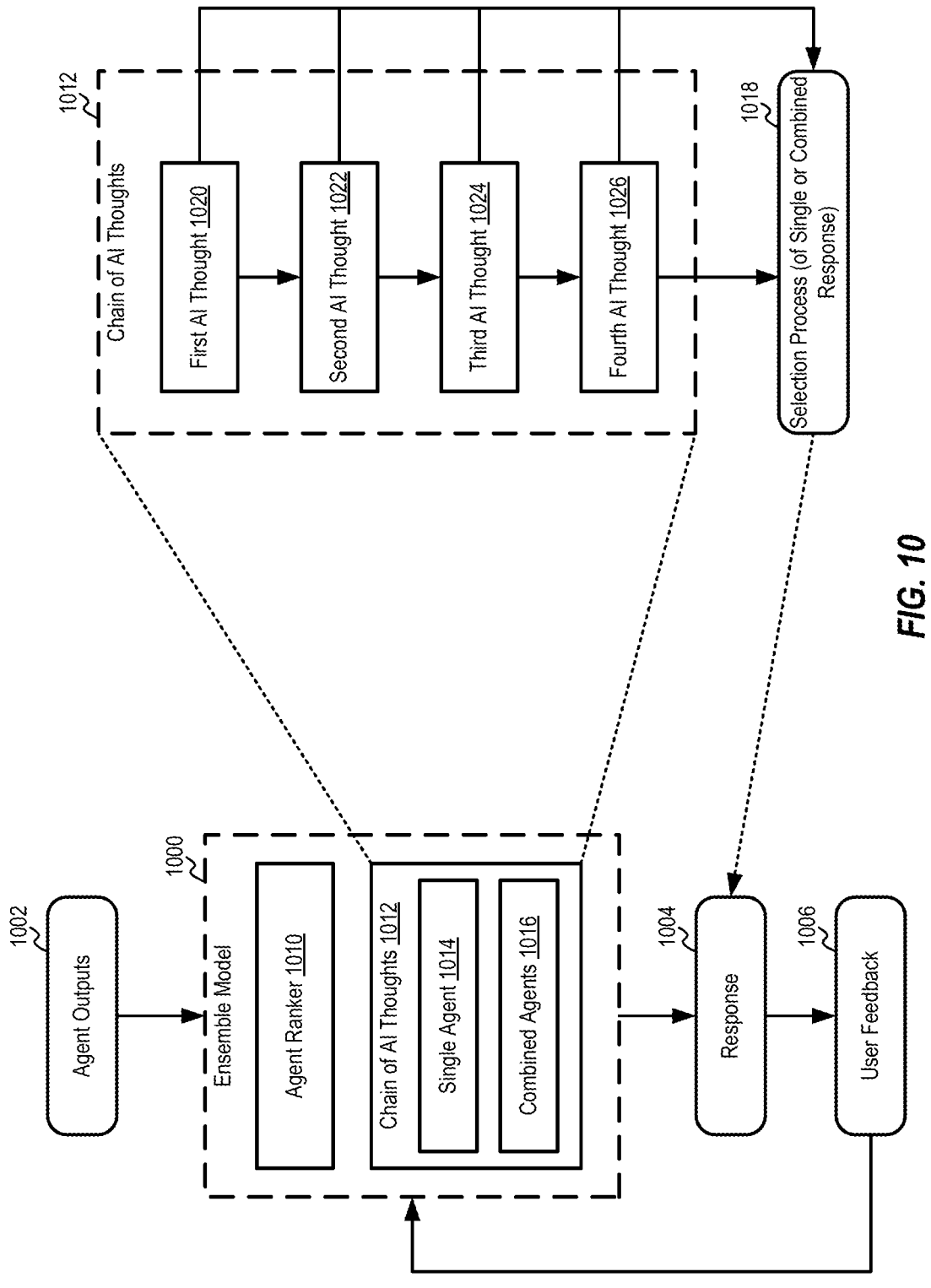
FIG. 10 is a block diagram of an example of an ensemble model of generative AI agents that support generative AI-assisted analytics of structured data sets according to one or more aspects.

FIG. 10 illustrates an example of an ensemble model 1000 of AI agents that support generative AI-assisted analytics of structured data sets according to one or more aspects of the present disclosure. In some implementations, the ensemble model 1000 may include or correspond to the ensemble model created from the generative AI agents 126 of FIG. 1 or the ensemble model 220 of FIG. 2. The ensemble model 1000 is configured to receive agent outputs 1002 (e.g., the responses of the generative AI agents associated with the ensemble model 1000) and to generate a response 1004 (e.g., an ensemble response) that represents a response to a user question indicated by a prompt. As shown in FIG. 10, the ensemble model 1000 includes an agent ranker 1010 and a chain of AI thoughts 1012. The agent ranker 1010 is configured to rank the agent outputs 1002 (e.g., the agent responses) based on various criteria, such as the agent output itself, the relevance of the response to the user's question, historical performance of the generative AI agent that generated the response, other criteria, or a combination thereof. In some implementations, at least some of the various criteria may be weighted, and the ranking may be based on a weighted combination of the various criteria.

The chain of AI thoughts 1012 represents AI "thoughts" during the process of selecting the response 1004 from the agent outputs 1002. As an initial thought, the chain of AI thoughts 1012 may include a single agent 1014 decision or a combined agents 1016 decision. The single agent 1014 decision represents or corresponds to a determination by the ensemble model 1000 to select the response 1004 from the highest-ranked single generative AI agent if the ensemble model 1000 determines the output of the highest-ranked agent is sufficient to answer the user question represented by the prompt. The combined agent 1016 decision represents or corresponds to a determination by the ensemble model 1000 to combine the outputs from multiple generative AI agents to create a more comprehensive and accurate output as the response 1004.

The single agent 1014 decision or the combined agents 1016 decision may be based on multiple AI "thoughts" that make up the chain of AI thoughts 1012. These thoughts may include one or more of a first AI thought 1020, a second AI thought 1022, a third AI thought 1024, and a fourth AI thought 1026, which result in a selection process 1018 of either the single agent 1014 decision or the combined agents 1016 decision (e.g., a selection of basing the response 1004 on an output of a single generative AI agent or the outputs of multiple generative AI agents). The first AI thought 1020 represents a complexity evaluation. For example, the first AI thought 1020 may evaluate the complexity and nature of the prompt and the agent outputs 1002, and if the prompt is straightforward and a single generative AI agent's response of the agent outputs 1002 is sufficient, the chain of AI thoughts 1012 proceeds to the selection process 1018 to select the single agent 1014 decision. Otherwise, the chain of AI thoughts 1012 continues to the second AI thought 1022. The second AI thought 1022 represents a confidence level assessment. For example, the second AI thought 1022 may assess the confidence levels of the individual agent responses of the agent outputs 1002, and if one generative AI agent's response is significantly more confident than the others, the chain of AI thoughts 1012 proceeds to the selection process 1018 to select the single agent 1014 decision. Otherwise, the chain of AI thoughts 1012 continues to the third AI thought 1024.

The third AI thought 1024 represents a response diversity evaluation. For example, the third AI thought 1024 may evaluate the diversity of the agent outputs 1002 and, if the responses are sufficiently diverse and combining the responses could lead to a more comprehensive answer, the chain of AI thoughts 1012 proceeds to the selection process 1018 to select the combined agents 1016 decision. Otherwise, the chain of AI thoughts 1012 continues to the fourth AI thought 1026. The fourth AI thought 1026 represents a historical performance analysis. For example, the fourth AI thought 1026 may take into account the historical performance of individual generative AI agents on similar prompts, and if there is evidence that certain generative AI agents perform better for this type of prompt, the flow proceeds to the selection process 1018 to select the single agent 1014 decision (e.g., for the generative AI agent that performs best for this type of prompt). Otherwise, the chain of AI thoughts 1012 continues to the selection process 1018 to select the combined agents 1016 decision.

After performing the chain of AI thoughts 1012, the ensemble model 1000 selects either the single agent 1014 decision or the combined agents 1016 decision, and the response 1004 is generated based on the selected decision. For example, if the selection process 1018 selects the single agent 1014 decision, the ensemble model 1000 selects the output of the appropriate generative AI agent as the response 1004. Alternatively, if the selection process 1018 selects the combined agents 1016 decision, the ensemble model 1000 selects a combination of outputs of multiple generative AI agents as the response 1004. The combined agents 1016 may be executed in parallel (e.g., concurrently) or in a sequence, depending on the results of the chain of AI thoughts 1012. As an example, if the combined agents 1016 include multiple agents that satisfy a threshold confidence, the response 1004 may be generated based on an aggregation, such as a weighted aggregation, of the outputs of the combined agents 1016. As another example, if the combined agents 1016 include multiple agents that are each associated with a single individual task or sub-task, the combined agents 1016 may be executed in a particular sequence in order to generate the response 1004, such as executing one or more SQL or other agents to generate a numerical response, followed by execution of a visualization agent to generate a graph or other visualization output. In some implementations, the user may provide user feedback 1006 based on the response 1004, and the ensemble model 1000 may update the parameters of the response selection process based on the user feedback 1006. For example, the ensemble model 1000 may adjust one or more of criteria used by the agent ranker 1010 based on the user feedback 1006. As another example, the ensemble model 1000 may adjust one or more of the chain of AI thoughts 1012, or may add an AI thought to or delete an AI thought from the chain of AI thoughts 1012, based on the user feedback 1006. In this manner, the ensemble model 1000 may perform continuous learning to increase accuracy and/or user satisfaction with the generated responses.

Figure 11:
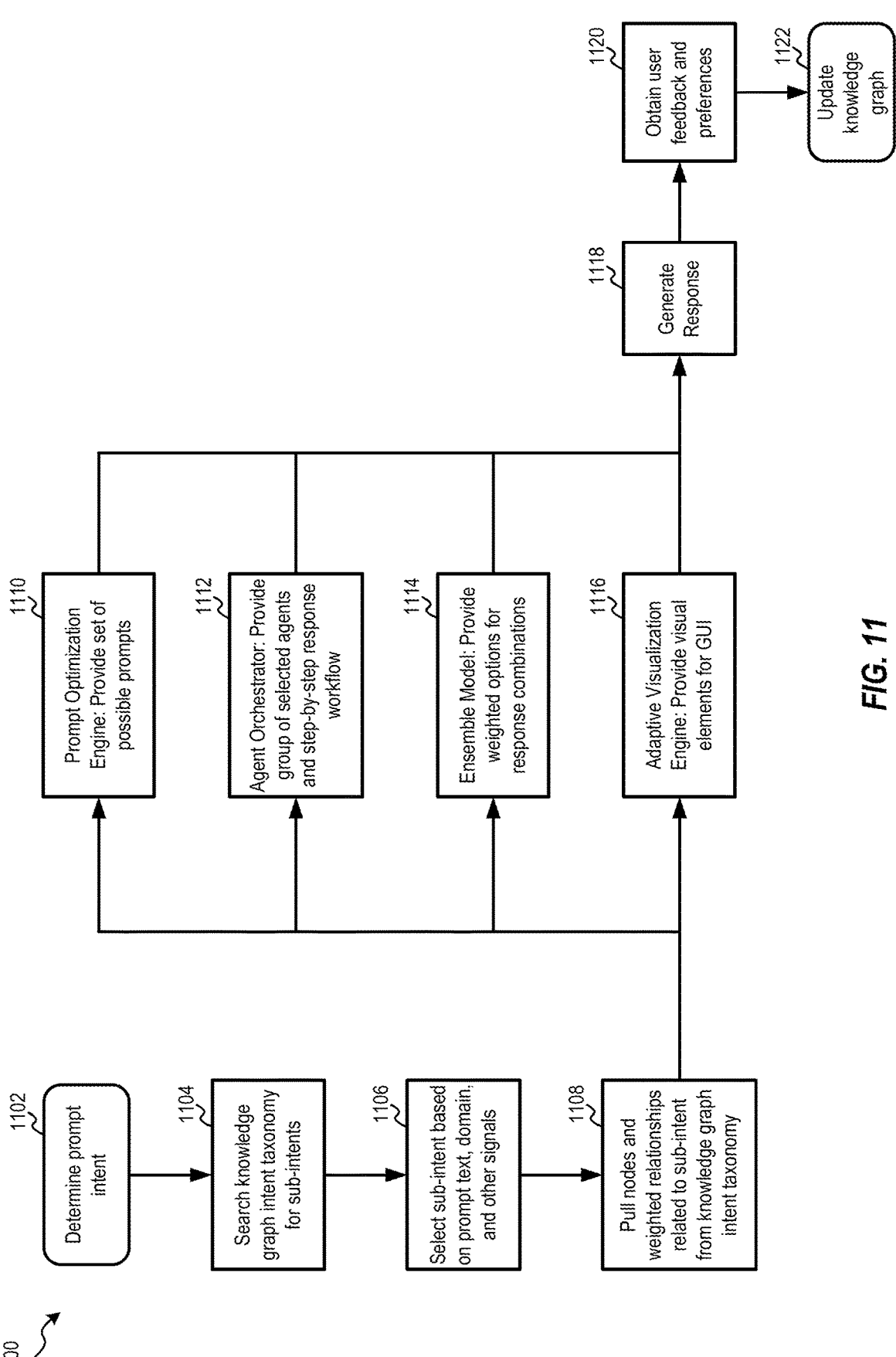
FIG. 11 is a flow diagram illustrating an example process flow for supporting generative AI-assisted analytics that incorporate updates based on user feedback according to one or more aspects.

Referring to FIG. 11, an example of a process flow diagram for supporting generative AI-assisted analytics that incorporate updates based on user feedback according to one or more aspects of the present disclosure is shown as a process flow 1100. In some implementations, operations described with reference to the process flow 1100 may be performed by one or more components of the system 100 of FIG. 1 or the generative AI analytics engine 200 of FIG. 2, such as one or more of the computing device 102 or the user device 150 of FIG. 1 or the disambiguation engine 210 of FIG. 2.

The process flow 1100 includes determining an intent of a user prompt, at 1102. For example, the automated intent detection engine 212 of FIG. 2 may process the user prompt and determine an intent of the user prompt, such as by extracting one or more contextual features to generate a semantic embedding and comparing the semantic embedding to known intent embeddings to determine a most similar intent from a database of intent embeddings. Additionally or alternatively, the intent may be identified by providing the prompt to a trained ML or AI model that is trained to classify intent based on prompts (or embedding vectors). The process flow 1100 includes searching a knowledge graph intent taxonomy for sub-intents, at 1104, and selecting a sub-intent based on prompt text, domain, and other signals, at 1106. For example, a knowledge graph may be searched to find one or more intent or sub-intent nodes that most closely match the intent determined from the user prompt. The knowledge graph may represent intent taxonomies, intent-specific workflows, agents, and visualizations of prompts, providing a graph-based representation of the knowledge of responding to prompts using generative AI agents to perform analytics tasks on structured data sets. The process flow 1100 includes pulling nodes and weighted relationships related to the sub-intent from the knowledge graph, at 1108. For example, the identified node(s) and any children and/or weighted relationships may be retrieved from the knowledge graph. The process flow 1100 then proceeds to 1110, 1112, 1114, and 1116, which are performed by a prompt optimization engine, an agent orchestrator, an ensemble model, and an adaptive visualization engine, respectively.

The process flow 1100 includes providing a set of possible prompts, at 1110. For example, prompt optimization may be performed on a user prompt to provide one or more stored or cached prompts that are most similar to the user prompt. In some implementations, the user prompt may also be modified by performing data disambiguation operations, prompt disambiguation operations, or both. The process flow 1100 includes providing a group of selected generative AI agents and step-by-step response workflow, at 1112. For example, the agent orchestrator may extract agent features, intent features, and data schema features from the provided prompts, the available generative AI agents, and the structured data set to be used in responding to the prompts, and the agent orchestrator may select one or more of the available generative AI agents to perform tasks related to the prompts. The process flow 1100 includes providing weighted options for response combinations, at 1114. For example, the ensemble model may process outputs of the selected generative AI agents and provide a response based on an output of a single generative AI agent or a combination of outputs of multiple generative AI agents, as described above with reference to FIG. 10. In some implementations, the selection process may involve weighting the various criteria used in the selection, weighting the outputs of the selected generative AI agents, or a combination thereof. The process flow 1100 includes providing visual elements for a GUI, at 1116. For example, a visualization engine may be executed to generate one or more visual elements, such as charts, graphs, tables, or the like, based on data included in or indicated by the response of the ensemble model.

After completion of operations described with reference to 1110-1116, the process flow 1100 progresses to 1118, and a response is generated. For example, the response may include a GUI that provides a combination of text output, numerical output, and visualization elements. The process flow 1100 includes obtaining user feedback and preferences, at 1120. For example, the user may provide feedback on the quality or accuracy of the response, or additionally or alternatively, their preferences for use of certain agents, inclusion of particular types of visual elements, format of the GUI, or the like. The process flow 1100 concludes at 1122, and the knowledge graph is updated based on the user feedback and preferences. For example, weights between intents or sub-intents and visualizations, links between nodes, other relationships, or a combination thereof, may be modified in the knowledge graph as part of a continuous learning process to adapt the knowledge graph using real-time relationship and weight updates to improve accuracy and user satisfaction of the generated responses.

Referring to FIG. 12, a flow diagram of an example of a method for generative artificial intelligence-assisted analytics of structured data sets according to one or more aspects is shown as a method 1200. In some implementations, the operations of the method 1200 may be stored as instructions that, when executed by one or more processors (e.g., the one or more processors of a computing device or a server), cause the one or more processors to perform the operations of the method 1200. In some implementations, these instructions may be stored on a non-transitory computer-readable storage device or a non-transitory computer-readable storage medium. In some implementations, the method 1200 may be performed by a computing device, such as the computing device 102 of FIG. 1 (e.g., a device configured for intelligent digital content generation using first-party data), another device, or a combination thereof.

The method 1200 includes receiving a prompt including information associated with a structured data set, at 1202. The structured data set includes at least some numerical data. For example, the prompt may include or correspond to the prompt 170 of FIG. 1, and the structured data set may include or correspond to the structured data set 154 of FIG. 1. In some implementations, the structured data set includes multiple schemas, multiple data table formats, multiple data types, or a combination thereof. Additionally or alternatively, the information included in the prompt may include natural language text data representing a user question. The method 1200 includes providing the prompt as input to an agent orchestrator to select one or more generative AI agents to perform analytics tasks corresponding to the information, at 1204. The agent orchestrator includes a trained AI classifier configured to select the one or more generative AI agents from a plurality of generative AI agents. For example, the agent orchestrator may include or correspond to the agent orchestrator 124 of FIG. 1, and the plurality of generative AI agents may include or correspond to the generative AI agents 126 of FIG. 1.

The method 1200 includes executing an ensemble model to generate a response to the prompt based on the structured data set, at 1206. The ensemble model includes the one or more generative AI agents. For example, the response may include or correspond to the response 110 of FIG. 1, and the ensemble model may include one or more of the generative AI agents 126 of FIG. 1. In some implementations, the ensemble model includes one or more differently selected generative AI agents from the plurality of generative AI agents according to a greedy algorithm parameter. The method 1200 includes outputting a GUI that includes one or more elements based on the response, at 1208. For example, the GUI may include or correspond to the GUI 174 of FIG. 1, and the one or more elements may include or correspond to the visual elements 176 of FIG. 1.

In some implementations, the method 1200 further includes performing one or more data disambiguation operations, one or more prompt disambiguation operations, or both, based on the prompt and the structured data to modify the prompt prior to the prompt being provided as the input to the agent orchestrator. For example, the prompt 170 of FIG. 1 may undergo data disambiguation operations based at least partially on the data set embeddings 114, prompt disambiguation operations based at least partially on the mapped entities 116, or both. In some such implementations, the one or more data disambiguation operations include generating an embedding based on the prompt, performing, based on the embedding, a first semantic search on a plurality of table-level embeddings to identify one or more highest ranked table-level embeddings that correspond to one or more data tables of the structured data set, performing, based on the embedding, a second semantic search on a plurality of field-level embeddings to identify one or more highest ranked field-level embeddings that correspond to one or more fields of the one or more data tables, and modifying the prompt based on the one or more data tables, the one or more fields, or both. For example, the prompt 170 may undergo data disambiguation operations as described above with reference to FIGS. 2-5. In some such implementations, the method 1200 also includes, prior to receiving the prompt, accessing a generative AI model to generate one or more field descriptions based on fields of one or more data schema associated with the structured data set, generating the plurality of field-level embeddings based on the one or more field descriptions, grouping semantically similar field-level embeddings of the plurality of field-level embeddings into a plurality of additional tables of the structured data set, accessing the generative AI model to generate one or more table descriptions based on the plurality of additional tables, and generating the plurality of table-level embeddings based on the one or more table descriptions. For example, the descriptions may be generated by the generative AI model 128 of FIG. 1, and in accordance with the grouping and slicing described above with reference to FIG. 4.

In some implementations in which the method 1200 includes performing one or more prompt disambiguation operations, the one or more prompt disambiguation operations include determining an intent that corresponds to the prompt, performing entity extraction based on an entity mapping associated with the intent to extract one or more entities from the prompt, identifying at least one entity included in the set of entities that is not included in the one or more extracted entities, and modifying the prompt based on the at least one entity. For example, the entity mapping may include or correspond to one of the mapped entities 116 of FIG. 1. In some such implementations, modifying the prompt includes accessing a generative AI model to generate at least one contextual phrase based on the at least one entity and adding the at least one contextual phrase to the prompt. For example, the generative AI model may include or correspond to the generative AI models 128 of FIG. 1. Additionally or alternatively, modifying the prompt may include displaying, via the GUI, a request for additional information associated with the at least one entity, receiving a user response indicating the additional information, and adding the additional information to the prompt, as further described above with reference to FIG. 5.

In some implementations, the method 1200 further includes performing one or more prompt optimization operations based on the prompt to modify the prompt prior to the prompt being provided as the input to the agent orchestrator. The one or more prompt optimization operations include comparing the prompt to a set of cached prompts associated with recently performed analytics tasks, identifying a most similar prompt from the set of cached prompts based on the comparing, and modifying the prompt based on the most similar prompt. For example, the set of cached prompts may include or correspond to the cached prompts 122 of FIG. 1.

In some implementations, the agent orchestrator is trained to select the one or more generative AI agents based on agent features associated with a plurality of generative AI agents, intent features associated with the prompt, data schema features associated with the structured data set, or a combination thereof. For example, the orchestrator features 118 may include agent features, intent features, data schema features, or a combination thereof. In some such implementations, the agent features include expertise level, historical performance metrics, response time, or a combination thereof, the intent features include intent type, intent complexity, or a combination thereof, and the data schema features include data complexity, data type, data size, or a combination thereof, as further described above with reference to FIG. 8. Additionally, or alternatively, the agent orchestrator may further include a generative AI model configured to output a recommendation of the one or more generative AI agents based on an input prompt that includes the agent features, the intent features, the data schema features, or a combination thereof, as further described above with reference to FIG. 8.

In some implementations, the one or more elements include one or more visual representations of the response, including graphs, charts, tables, or a combination thereof. For example, the visual elements 176 of FIG. 1 may include graphs, charts, tables, other visual representations of statistics or mathematical data, or a combination thereof. In some such implementations, the structured data set includes multiple data tables, the ensemble model is configured to join at least two of the multiple data tables according to a selected join strategy to generate a results data table, and the one or more visual representations includes the results data table. For example, one or more data tables of the structured data set 154 may be joined by the generative AI analytics engine 200 of FIG. 2, and the adaptive visualization engine 222 may output a visual representation of the joined tables.

In some implementations, the method 1200 also includes maintaining an intent taxonomy knowledge graph based on a plurality of intents and sub-intents related to historical prompts and responses. For example, the intent taxonomy knowledge graph may include or correspond to the knowledge graph 120 of FIG. 1. In such implementations, the method 1200 further includes providing, via the GUI, a request for user feedback associated with the response, receiving a user input that indicates the user feedback and preferences associated with the prompt and the response, and modifying the intent taxonomy knowledge graph based on the prompt, the response, and the user feedback. For example, the user feedback may include or correspond to the user feedback 180, and the knowledge graph 120 may be modified based on the user feedback 180, as further described above with reference to FIG. 11.

It is noted that other types of devices and functionality may be provided according to aspects of the present disclosure and discussion of specific devices and functionality herein have been provided for purposes of illustration, rather than by way of limitation. It is noted that the operations of the process flow 400 of FIG. 4, the process flow 500 of FIG. 5, the process flow 600 of FIG. 6, the process flow 1100 of FIG. 11, and the method 1200 of FIG. 12 may be performed in any order. Additionally or alternatively, one or more operations described with reference to the process flow 400 of FIG. 4, the process flow 500 of FIG. 5, the process flow 600 of FIG. 6, the process flow 1100 of FIG. 11, or the method 1200 of FIG. 12 may be performed during performance of another of the process flow 400 of FIG. 4, the process flow 500 of FIG. 5, the process flow 600 of FIG. 6, the process flow 1100 of FIG. 11, or the method 1200 of FIG. 12. It is also noted that the process flow 400 of FIG. 4, the process flow 500 of FIG. 5, the process flow 600 of FIG. 6, the process flow 1100 of FIG. 11, or the method 1200 of FIG.

12 may also include other functionality or operations consistent with the description of the operations of the system 100 of FIG. 1, the generative AI analytics engine 200 of FIG. 2, the example of data disambiguation depicted in FIG. 3, the agent orchestrator system 700 of FIG. 7, the example 800 of FIG. 8, the agent orchestrator 900 of FIG. 9, or the ensemble model 1000 of FIG. 10.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-12) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for generative artificial intelligence-assisted analytics of structured data sets, the method comprising:

training, by one or more processors, an artificial intelligence (AI) classifier in selecting of one or more generative AI agents from a plurality of generative AI agents;

receiving, by one or more processors, a prompt comprising information associated with a structured data set, wherein the structured data set includes at least some numerical data;

performing, by the one or more processors, one or more data disambiguation operations based on the prompt and the structured data to modify the prompt prior to the prompt being provided as the input to an agent orchestrator, wherein the one or more data disambiguation operations comprise:

generating, by the one or more processors, an embedding based on the prompt;

performing, by the one or more processors and based on the embedding, a first semantic search on a plurality of table-level embeddings to identify one or more highest ranked table-level embeddings that correspond to one or more data tables of the structured data set;

performing, by the one or more processors and based on the embedding, a second semantic search on a plurality of field-level embeddings to identify one or more highest ranked field-level embeddings that correspond to one or more fields of the one or more data tables; and modifying, by the one or more processors, the prompt based on the one or more data tables, the one or more fields, or both;

providing, by the one or more processors, the prompt as input to the agent orchestrator to select the one or more generative (AI) AI agents to perform analytics tasks corresponding to the information, wherein the agent orchestrator comprises the trained AI classifier configured to select the one or more generative AI agents from the plurality of generative AI agents;

obtaining, by the one or more processors from the trained AI classifier, respective agent scores for the plurality of generative AI agents;

selecting, by the one or more processors, via the agent orchestrator, the one or more generative AI agents that include generative AI agents relevant to the prompt and a predetermined percentage of randomly selected generative AI agents from the plurality of generative AI agents based on respective agent scores;

generating, by the one or more processors, an ensemble model from the one or more generative AI agents;

executing, by the one or more processors, the ensemble model to generate a response to the prompt based on the structured data set;

outputting, by the one or more processors, a graphical user interface (GUI) that includes one or more elements based on the response.

2. The method of claim 1, wherein the information includes natural language text data representing a user question.

3. The method of claim 1, further comprising:

performing, by the one or more processors, the one or more data disambiguation operations, one or more prompt disambiguation operations, or both, based on the prompt and the structured data to modify the prompt prior to the prompt being provided as the input to the agent orchestrator.

4. The method of claim 1, further comprising, prior to receiving the prompt:

accessing, by the one or more processors, a generative AI model to generate one or more field descriptions based on fields of one or more data schema associated with the structured data set;

generating, by the one or more processors, the plurality of field-level embeddings based on the one or more field descriptions;

grouping, by the one or more processors, semantically similar field-level embeddings of the plurality of field-level embeddings into a plurality of additional tables of the structured data set, wherein the plurality of additional tables include tables based on similar field groupings, similar field values, or both;

accessing, by the one or more processors, the generative AI model to generate one or more table descriptions based on the plurality of additional tables; and generating, by the one or more processors, the plurality of table-level embeddings based on the one or more table descriptions.

5. The method of claim 3, wherein the one or more prompt disambiguation operations comprise:

determining, by the one or more processors, an intent that corresponds to the prompt;

performing, by the one or more processors, entity extraction based on an entity mapping associated with the intent to extract one or more entities from the prompt, wherein the entity mapping indicates a set of entities associated with the intent;

identifying, by the one or more processors, at least one entity included in the set of entities that is not included in the one or more extracted entities; and modifying, by the one or more processors, the prompt based on the at least one entity.

6. The method of claim 5, wherein modifying the prompt comprises:

accessing, by the one or more processors, a generative AI model to generate at least one contextual phrase based on the at least one entity; and adding, by the one or more processors, the at least one contextual phrase to the prompt.

7. The method of claim 5, wherein modifying the prompt comprises:

displaying, by the one or more processors via the GUI, a request for additional information associated with the at least one entity;

receiving, by the one or more processors, a user response indicating the additional information; and adding, by the one or more processors, the additional information to the prompt.

8. The method of claim 1, wherein the agent orchestrator is trained to select the relevant generative AI agents from the one or more generative AI agents based on agent features associated with the plurality of generative AI agents, intent features associated with the prompt, data schema features associated with the structured data set, or a combination thereof.

9. The method of claim 8, wherein the agent features include expertise level, historical performance metrics, response time, or a combination thereof, wherein the intent features include intent type, intent complexity, or a combination thereof, and wherein the data schema features include data complexity, data type, data size, or a combination thereof.

10. A system for generative artificial intelligence-assisted analytics of structured data sets, the system comprising:

a memory; and one or more processors communicatively coupled to the memory, the one or more processors configured to:

train an AI classifier in selecting one or more generative AI agents from a plurality of generative artificial intelligence (AI) agents;

receive a prompt comprising information associated with a structured data set, wherein the structured data set includes at least some numerical data;

perform one or more data disambiguation operations based on the prompt and the structured data to modify the prompt prior to the prompt being provided as the input to an agent orchestrator, wherein the one or more data disambiguation operations comprise:

generate, by the one or more processors, an embedding based on the prompt;

perform, by the one or more processors and based on the embedding, a first semantic search on a plurality of table-level embeddings to identify one or more highest ranked table-level embeddings that correspond to one or more data tables of the structured data set;

perform, by the one or more processors and based on the embedding, a second semantic search on a plurality of field-level embeddings to identify one or more highest ranked field-level embeddings that correspond to one or more fields of the one or more data tables; and modify, by the one or more processors, the prompt based on the one or more data tables, the one or more fields, or both;

provide the prompt as input to the agent orchestrator to select the one or more generative artificial intelligence (AI) agents to perform analytics tasks corresponding to the information, wherein the agent orchestrator comprises the trained AI classifier configured to select the one or more generative AI agents from the plurality of generative AI agents;

obtain from the trained AI classifier, respective agent scores for the plurality of generative AI agents;

select via the agent orchestrator, the one or more generative AI agents that include generative AI agents relevant to the prompt and a predetermined percentage of randomly selected generative AI agents from the plurality of generative AI agents based on respective agent scores;

generate an ensemble model including the one or more generative AI agents;

execute the ensemble model to generate a response to the prompt based on the structured data set;

output a graphical user interface (GUI) that includes one or more elements based on the response.

11. The system of claim 10, wherein the one or more elements include one or more visual representations of the response, the one or more visual representations including graphs, charts, tables, or a combination thereof.

12. The system of claim 11, wherein:

the structured data set includes multiple data tables;

the ensemble model is configured to join at least two of the multiple data tables according to a selected join strategy to generate a results data table; and the one or more visual representations includes the results data table.

13. The system of claim 10, wherein the structured data set includes multiple schemas, multiple data table formats, multiple data types, or a combination thereof and the agent orchestrator is trained to select the one or more generative AI agents based on agent features associated with a plurality of generative AI agents, intent features associated with the prompt, data schema features associated with the structured data set, or a combination thereof.

14. A non-transitory computer-readable storage device comprising instructions that, when executed by one or more processors, cause the one or more processors to perform operations for generative artificial intelligence-assisted analytics of structured data sets, the operations comprising:

training an AI classifier included in an agent orchestrator in selecting one or more generative AI agents from a plurality of generative artificial intelligence (AI) agents;

receiving a prompt comprising information associated with a structured data set, wherein the structured data set includes at least some numerical data;

performing, by the one or more processors, one or more data disambiguation operations based on the prompt and the structured data to modify the prompt prior to the prompt being provided as the input to an agent orchestrator, wherein the one or more data disambiguation operations comprise:

generating, by the one or more processors, an embedding based on the prompt:

performing, by the one or more processors and based on the embedding, a first semantic search on a plurality of table-level embeddings to identify one or more highest ranked table-level embeddings that correspond to one or more data tables of the structured data set;

performing, by the one or more processors and based on the embedding, a second semantic search on a plurality of field-level embeddings to identify one or more highest ranked field-level embeddings that correspond to one or more fields of the one or more data tables; and modifying, by the one or more processors, the prompt based on the one or more data tables, the one or more fields, or both;

providing the prompt as input to the agent orchestrator to select the one or more generative AI agents to perform analytics tasks corresponding to the information, wherein the agent orchestrator comprises the trained AI classifier configured to select the one or more generative AI agents from the plurality of generative AI agents;

obtaining, from the trained AI classifier, respective agent scores for the plurality of generative AI agents;

selecting, by the one or more processors, via the agent orchestrator, the one or more generative AI agents that include generative AI agents relevant to the prompt and a predetermined percentage of randomly selected generative AI agents from the plurality of generative AI agents based on respective agent scores;

generating, by the one or more processors, an ensemble model from the one or more generative AI agents;

executing the ensemble model to generate a response to the prompt based on the structured data set, outputting a graphical user interface (GUI) that includes one or more elements based on the response.

15. The non-transitory computer-readable storage device of claim 14, wherein the randomly-selected generative AI agents are selected from the plurality of generative AI agents according to a greedy algorithm parameter.

16. The non-transitory computer-readable storage device of claim 15, wherein the operations further comprise:

maintaining an intent taxonomy knowledge graph based on a plurality of intents and sub-intents related to historical prompts and responses;

providing, via the GUI, a request for user feedback associated with the response;

receiving a user input that indicates the user feedback and preferences associated with the prompt and the response; and modifying the intent taxonomy knowledge graph based on the prompt, the response, and the user feedback.

17. The non-transitory computer-readable storage device of claim 14, wherein the operations further comprise:

performing one or more prompt optimization operations based on the prompt to modify the prompt prior to the prompt being provided as the input to the agent orchestrator, wherein the one or more prompt optimization operations include:

comparing the prompt to a set of cached prompts associated with recently performed analytics tasks;

identifying a most similar prompt from the set of cached prompts based on the comparing; and modifying the prompt based on the most similar prompt.

18. The non-transitory computer-readable storage device of claim 15, wherein the operations of selecting the one or more generative AI agents further comprise:

selecting, via the agent orchestrator in an exploration phase, the predetermined percentage of randomly selected generative AI agents along with the generative AI agents relevant to the prompt; and further selecting via the agent orchestrator in an exploitation phase, one or more highest scoring generative AI agents based on the respective agent scores from the plurality of generative AI agents as the generative AI agents relevant to the prompt in the exploration phase.

19. The non-transitory computer-readable storage device of claim 18, wherein the operations of selecting the one or more generative AI agents further comprise:

training, by the one or more processors, the AI classifier via one of supervised learning or unsupervised learning.

* * * * *